United States Patent
Sun

(10) Patent No.: US 12,556,015 B2
(45) Date of Patent: Feb. 17, 2026

(54) MOBILE POWER SUPPLY AND METHOD FOR SUPPLYING POWER TO PERIPHERAL DEVICE

(71) Applicant: Matrixed Reality Technology Co., Ltd., Wuxi (CN)

(72) Inventor: Pengda Sun, Beijing (CN)

(73) Assignee: Matrixed Reality Technology Co., Ltd., Wuxi (CN)

( * ) Notice: Subject to any disclaimer, the term of this patent is extended or adjusted under 35 U.S.C. 154(b) by 904 days.

(21) Appl. No.: 17/784,258

(22) PCT Filed: Oct. 20, 2020

(86) PCT No.: PCT/CN2020/122108
§ 371 (c)(1),
(2) Date: Jun. 10, 2022

(87) PCT Pub. No.: WO2021/114875
PCT Pub. Date: Jun. 17, 2021

(65) Prior Publication Data
US 2023/0042872 A1 Feb. 9, 2023

(30) Foreign Application Priority Data
Dec. 12, 2019 (CN) .......................... 201911277726.9

(51) Int. Cl.
*H02J 7/00* (2006.01)
*G06F 13/42* (2006.01)
(Continued)

(52) U.S. Cl.
CPC ........ *H02J 7/0063* (2013.01); *G06F 13/4282* (2013.01); *H02J 7/00712* (2020.01);
(Continued)

(58) Field of Classification Search
CPC ................ H02J 7/0063; H02J 7/00712; H02J 7/007182; H02J 7/342; H02J 1/14;
(Continued)

(56) References Cited

FOREIGN PATENT DOCUMENTS

CN 203607882 U * 5/2014
CN 204948267 U 1/2016
(Continued)

*Primary Examiner* — Julian D Huffman
*Assistant Examiner* — Nathan J Instone
(74) *Attorney, Agent, or Firm* — K&L Gates LLP

(57) ABSTRACT

The present disclosure provides a mobile power supply and a method for supplying power to a peripheral device. The mobile power supply comprises a first peripheral connection port and a second peripheral connection port, a first group of connection-port processing circuits and a second group of connection-port processing circuits, a control circuit, and a power supply circuit. A control strategy determining circuit in each group of connection-port processing circuits determines a voltage adjustment strategy according to power supply status information of a corresponding peripheral connection port. The control circuit then causes a voltage adjusting circuit in the connection-port processing circuit to adjust, according to the voltage adjustment strategy, a voltage output by the power supply circuit, such that the adjusted voltage is used to supply power to a peripheral device coupled, by means of a power supply terminal, to the peripheral connection port.

20 Claims, 8 Drawing Sheets

(51) Int. Cl.
  *H02J 1/14* (2006.01)
  *H02J 7/34* (2006.01)
(52) U.S. Cl.
  CPC ........ *H02J 7/007182* (2020.01); *H02J 7/342* (2020.01); *G06F 2213/0042* (2013.01); *H02J 1/14* (2013.01); *H02J 2207/20* (2020.01); *H02J 2207/30* (2020.01)
(58) Field of Classification Search
  CPC ............. H02J 2207/20; H02J 2207/30; G06F 13/4282; G06F 2213/0042
  USPC ....................................................... 320/107
  See application file for complete search history.

(56) References Cited

FOREIGN PATENT DOCUMENTS

| | | | | | |
|---|---|---|---|---|---|
| CN | 105975039 | A | * | 9/2016 | |
| CN | 207753497 | U | * | 8/2018 | |
| CN | 207835086 | U | | 9/2018 | |
| CN | 110336351 | A | * | 10/2019 | ......... G06F 13/4282 |
| CN | 111064243 | A | | 4/2020 | |
| CN | 210691253 | U | | 6/2020 | |

* cited by examiner

MOBILE POWER SUPPLY AND METHOD FOR SUPPLYING POWER TO PERIPHERAL DEVICE

CROSS-REFERENCE TO RELATED APPLICATIONS

The present application is a national phase entry under 35 USC § 371 of International Application PCT/CN2020/122108, filed on Oct. 20, 2020, which claims the benefit of and priority to Chinese Patent Application No. 201911277726.9, filed on Dec. 12, 2019, the entire disclosures of which are incorporated herein by reference.

FIELD

The disclosure relates generally to the field of electronic circuits, and more particularly, to mobile power supply and method for supplying power to peripheral device.

BACKGROUND

AR (Augmented Reality) is a technology that ingeniously integrates virtual information with the real world, and AR has been widely used in multimedia, 3D modeling, real-time tracking and registration, intelligent interaction, sensing and other technical means, where computer-generated texts, images, 3D models, music, videos and other virtual information are simulated and applied to the real world, and the two kinds of information complement each other, thereby enhancing the real world.

Currently, an application of AR technology is smart glasses systems, the smart glasses systems include smart glasses and master control devices, the smart glasses are connected to the master control devices through cables. The master control devices receive data collected by the smart glasses through the cable and process it, and the smart glasses receive data processed by the master control device through the cable and display it. The master control devices also can charge the smart glasses.

SUMMARY

In view of the above, the present disclosure provides a mobile power supply and a method for supplying power to a peripheral device. The mobile power supply includes a first peripheral interface and a second peripheral interface, a first group of interface processing circuits and a second group of interface processing circuits, a control circuit and a power supply circuit. A control strategy determining circuit of each group of interface processing circuits is configured to determine a voltage adjustment strategy according to a power supply status information of a corresponding peripheral interface, and the control circuit is configured to control a voltage adjusting circuit of an interface processing circuit to adjust voltage output by the power supply circuit according to a voltage adjustment strategy, to supply power with the adjusted voltage to a peripheral device coupled to the peripheral interface via the power supply terminal. The mobile power supply, when electrically connected to the peripheral device via the power supply terminal of the peripheral interface, can supply power to the peripheral device, and data terminals of the first peripheral interface and the second peripheral interface provide the peripheral device with a data communication channel.

According to an aspect of the present disclosure, a mobile power supply is provided, including: a first peripheral interface and a second peripheral interface, each of the first peripheral interface and the second peripheral interface having a data terminal and a power supply terminal, and the data terminal of the first peripheral interface being electrically connected to the data terminal of the second peripheral interface to establish a data transmission channel; a first group of interface processing circuits and a second group of interface processing circuits, each group of interface processing circuits including a control strategy determining circuit and a voltage adjusting circuit; a control circuit; and a power supply circuit electrically connected to the voltage adjusting circuit, in which the first group of interface processing circuits are electrically connected to the first peripheral interface and the control circuit, and the second group of interface processing circuits are electrically connected to the second peripheral interface and the control circuit, and the control strategy determining circuit is configured to determine the voltage adjustment strategy of the voltage adjusting circuit according to power-supplying status information of a corresponding peripheral interface, and the control circuit is configured to cause the voltage adjusting circuit to adjust voltage output by the power supply circuit according to the voltage adjustment strategy, to supply power with the adjusted voltage to a peripheral device coupled to the peripheral interface via the power supply terminal.

Optionally, in an example of the aspect described above, the data terminal of the first peripheral interface is further configured to output interface status information of the first peripheral interface, and the data terminal of the second peripheral interface is further configured to output interface status information of the second peripheral interface, in which the interface status information includes power-supplying status information.

Optionally, in an example of the aspect described above, each of the first peripheral interface and the second peripheral interface further has an interface status information terminal, and the interface status information terminal is configured to output the interface status information of the corresponding peripheral interface, the interface status information includes power-supplying status information.

Optionally, in an example of the aspect described above, each group of interface processing circuits further includes a data communication channel switching circuit, and the data terminal of the first peripheral interface is electrically connected to the data terminal of the second peripheral interface via the data communication channel switching circuit corresponding to the first peripheral interface and the data communication channel switching circuit corresponding to the second peripheral interface, in which the control strategy determining circuit is configured to determine a channel switching control strategy of the data communication channel switching circuit according to a corresponding connection mode of the data terminal of the first peripheral interface and the data terminal of the second peripheral interface; and the control circuit is configured to cause the data communication channel switching circuit to perform data communication channel switching according to the channel switching control strategy, to enable the peripheral device to establish data transmission channel via respective connected data terminals to implement data communication.

Optionally, in an example of the aspect described above, each group of interface processing circuits further includes a data communication channel switching circuit, and the data terminal of the first peripheral interface is electrically connected to the data terminal of the second peripheral interface via the data communication channel switching circuit corresponding to the first peripheral interface and the data communication channel switching circuit corresponding to the second peripheral interface, in which the interface status information further includes device insertion direction indication information, and the device insertion direction indication information is configured to indicate an insertion direction of an interface connected to the peripheral interface relative to the peripheral interface, the control strategy determining circuit is configured to determine a channel switching control strategy of the data communication channel switching circuit according to the device insertion direction indication information, and the control circuit is configured to cause the data communication channel switching circuit to perform data communication channel switching according to the channel switching control strategy, to enable the peripheral device to establish data transmission channels via the respective connected data terminals to implement data communication.

Optionally, in an example of the aspect described above, the interface status information further includes data communication indication information, and the control strategy determining circuit is configured to determine a channel switching control strategy of the data communication channel switching circuit according to the device insertion direction indication information, in response to that the data communication indication information indicates performance of data communication.

Optionally, in an example of the aspect described above, the first peripheral interface and the second peripheral interface are both type-c interfaces.

Optionally, in an example of the aspect described above, the interface status information further includes power-supplying mode information, and the control strategy determining circuit is configured to determine the voltage adjustment strategy according to the power-supplying status information and the power-supplying mode information.

Optionally, in an example of the aspect described above, the mobile power supply supports PD protocol.

Optionally, in an example of the aspect described above, the power supply circuit includes a power conversion circuit for providing a regulated voltage in the mobile power supply.

Optionally, in an example of the aspect described above, the power supply circuit further includes a battery circuit, the battery circuit is configured to store energy and supply power.

Optionally, in an example of the aspect described above, the battery circuit includes a battery pack, a charging circuit and a charging power supply control circuit, and the charging circuit is connected to the battery pack and the charging power supply control circuit.

Optionally, in an example of the aspect described above, the charging circuit is configured to balance the power of respective battery cells in the battery pack.

Optionally, in an example of the aspect described above, an electric energy output terminal of the battery circuit includes a power supply terminal of the battery pack and an electric energy output terminal of the charging circuit, in which the electric energy output terminal is connected to the power conversion circuit and the voltage adjusting circuit.

Optionally, in an example of the aspect described above, an electrical transmission line electrically connecting the battery pack and the charging circuit is provided with a switch, a first end of the switch is electrically connected to the power supply terminal of the battery pack, and a second end is electrically connected to the electric energy output terminal of the charging circuit and the electric energy output terminal of the battery circuit, the control circuit is communicatively connected to the switch, the charging circuit and the charging power supply control circuit.

Optionally, in an example of the aspect described above, the control circuit is integrated into a component with at least one of the following circuits: a control strategy determining circuit; a voltage adjusting circuit; and a data communication channel switching circuit.

Optionally, in an example of the aspect described above, further including a housing, the first group of interface processing circuits, the second group of interface processing circuits, the control circuit and the power supply circuit are arranged inside the housing, and the first peripheral interface and the second peripheral interface are embedded in the housing and shown.

According to another aspect of the present disclosure, a power supplying and communication system is also provided, including: the mobile power supply as described above; a first peripheral device, electrically connected to the mobile power supply via the first peripheral interface; a second peripheral device, electrically connected to the mobile power supply via the second peripheral interface; in which the mobile power supply supplies power to the first peripheral device via the first peripheral interface, and supplies power to the second peripheral device via the second peripheral interface; and the mobile power supply provides a data transmission channel via the first peripheral interface and the second peripheral interface to enable data transmission between the first peripheral device and the second peripheral device.

Optionally, in an example of the aspect described above, the first peripheral device includes smart glasses using virtual reality technology, and the second peripheral device includes a master control device for controlling the smart glasses.

According to another aspect of the present disclosure, a method for supplying power to a peripheral device is also provided, the method being performed by a mobile power supply, the mobile power supply including a first peripheral interface and a second peripheral interface, a first group of interface processing circuits and a second group of interface processing circuits, a control circuit and a power supply circuit, each of the first peripheral interface and the second peripheral interface having a data terminal and a power supply terminal, and the data terminal of the first peripheral interface being electrically connected to the data terminal of the second peripheral interface to establish a data transmission channel, each group of interface processing circuits including a control strategy determining circuit and a voltage adjusting circuit, the method including: after the peripheral device connecting to at least one of the first peripheral interface and the second peripheral interface, obtaining interface status information of the connected peripheral interface, the interface status information includes power-supplying status information; at the control strategy determining circuit, determining a voltage adjustment strategy of the voltage adjusting circuit according to the power-supplying status information; and at the control circuit, causing the voltage adjusting circuit to adjust voltage output by the power supply circuit according to the voltage adjustment strategy, to supply power with the adjusted voltage to the peripheral device via the power supply terminal.

Optionally, in an example of the aspect described above, the interface status information includes charging mode information, and the voltage adjustment strategy is determined according to the power-supplying status information and the charging mode information.

Optionally, in an example of the aspect described above, the data terminal of the first peripheral interface is further configured to output interface status information of the first peripheral interface, and the data terminal of the second peripheral interface is further configured to output interface status information of the second peripheral interface, in which the interface status information includes power-supplying status information.

Optionally, in an example of the aspect described above, each of the first peripheral interface and the second peripheral interface further has an interface status information terminal, and the interface status information terminal is configured to output the interface status information of the corresponding peripheral interface.

Optionally, in an example of the aspect described above, each group of interface processing circuits further includes a data communication channel switching circuit, and the data terminal of the first peripheral interface is electrically connected to the data terminal of the second peripheral interface via the data communication channel switching circuit corresponding to the first peripheral interface and the data communication channel switching circuit corresponding to the second peripheral interface; the method further including: at the control strategy determining circuit, determining the channel switching control strategy of the data communication channel switching circuit according to a corresponding connection mode of the data terminal of the first peripheral interface and the data terminal of the second peripheral interface; and at the control circuit, causing the data communication channel switching circuit to perform data communication channel switching according to the channel switching control strategy, to enable the peripheral device to establish data transmission channels via respective connected data terminals to implement data communication.

Optionally, in an example of the aspect described above, each group of interface processing circuits further includes a data communication channel switching circuit, and the data terminal of the first peripheral interface is electrically connected to the data terminal of the second peripheral interface via the data communication channel switching circuit corresponding to the first peripheral interface and the data communication channel switching circuit corresponding to the second peripheral interface, in which the interface status information further includes device insertion direction indication information, and the device insertion direction indication information is configured to indicate an insertion direction of an interface connected to the peripheral interface relative to the peripheral interface, and the method further including: at the control strategy determining circuit, determining a channel switching control strategy of the data communication channel switching circuit according to the device insertion direction indication information; at the control circuit, causing the data communication channel switching circuit to perform data communication channel switching according to the channel switching control strategy; and in response to a data communication request initiated by a peripheral device, implementing data communication between the peripheral devices performing data communication via the switched data communication channel.

Optionally, in an example of the aspect described above, the interface status information further includes data communication indication information, and the channel switching control strategy is determined according to the device insertion direction indication information in response to that the data communication indication information indicates performance of data communication.

Optionally, in an example of the aspect described above, the power supply circuit includes a battery circuit and a power conversion circuit, the battery circuit including a battery pack and a switch configured to control power feeding into and output from the battery pack; the method further including: in response to that the battery circuit is not connected to an external charging power supply, the switch is closed, and the battery pack supplies power to the mobile power supply via the switch; in response to that the battery circuit is connected to an external charging power supply and the battery pack is not fully charged, the switch is closed, and the battery pack receives power provided by the external charging power supply; in response to that the battery circuit is connected to an external charging power supply and the battery pack is fully charged, the switch is opened, and the battery pack stops receiving power provided by the external charging power supply.

Optionally, in an example of the aspect described above, the battery circuit further including a charging circuit and a charging power supply control circuit, and an electrical transmission line electrically connecting the battery pack and the charging circuit is provided with the switch, a first end of the switch is electrically connected to the power supply terminal of the battery pack, and a second end is electrically connected to the electric energy output terminal of the charging circuit and an electric energy output terminal of the battery circuit; the method further including: receiving a signal originating from the charging power supply control circuit indicating that no external charging power supply is connected, causing the switch to be closed, and causing the battery pack to supply power to the mobile power supply through the switch and the electric energy output terminal of the battery circuit; receiving a signal originating from the charging power supply control circuit and indicating that an external charging power supply is connected, and a signal originating from the charging circuit and indicating that the battery pack is not fully charged, causing the switch to be closed, and causing the external charging power supply, through the charging circuit and the electric energy output terminal of the battery circuit, to supply power to the mobile power supply and to the battery pack; receiving a signal originating from the charging power supply control circuit and indicating that an external charging power supply is connected, and a signal originating from the charging circuit and indicating that the battery pack is fully charged, causing the switch to be opened, and causing the external charging power supply, through the charging circuit and the electric energy output terminal of the battery circuit, to supply power to the mobile power supply and stop supplying power to the battery pack.

According to another aspect of the present disclosure, an electronic device is also provided, including: at least one processor, and a memory coupled to the at least one processor, the memory storing instructions, which, when executed by the at least one processor, cause the at least one processor to perform the method as described above.

According to another aspect of the present disclosure, a machine-readable store medium storing executable instructions is also provided, which, when executed, cause the machine to perform the method for supplying power to peripheral devices described above.

BRIEF DESCRIPTION OF THE DRAWINGS

By referring to the following appended drawings, a further understanding of the nature and advantages of the present disclosure may be achieved. In the appended drawings, similar components or features may have the same reference label. The appended drawings are used to provide a further understanding of the embodiments of the present invention and constitute a part of the specification, and used to, together with the following detailed description, explain the embodiments of the present disclosure, but do not constitute a limitation to the embodiments of the present disclosure.

FIG. 3(a) shows a schematic diagram of pin configuration of a type-c receptacle of an example.

FIG. 3(b) shows a schematic diagram of pin configuration of a type-c plug of an example.

DESCRIPTION OF REFERENCE LABEL

Figure 1:
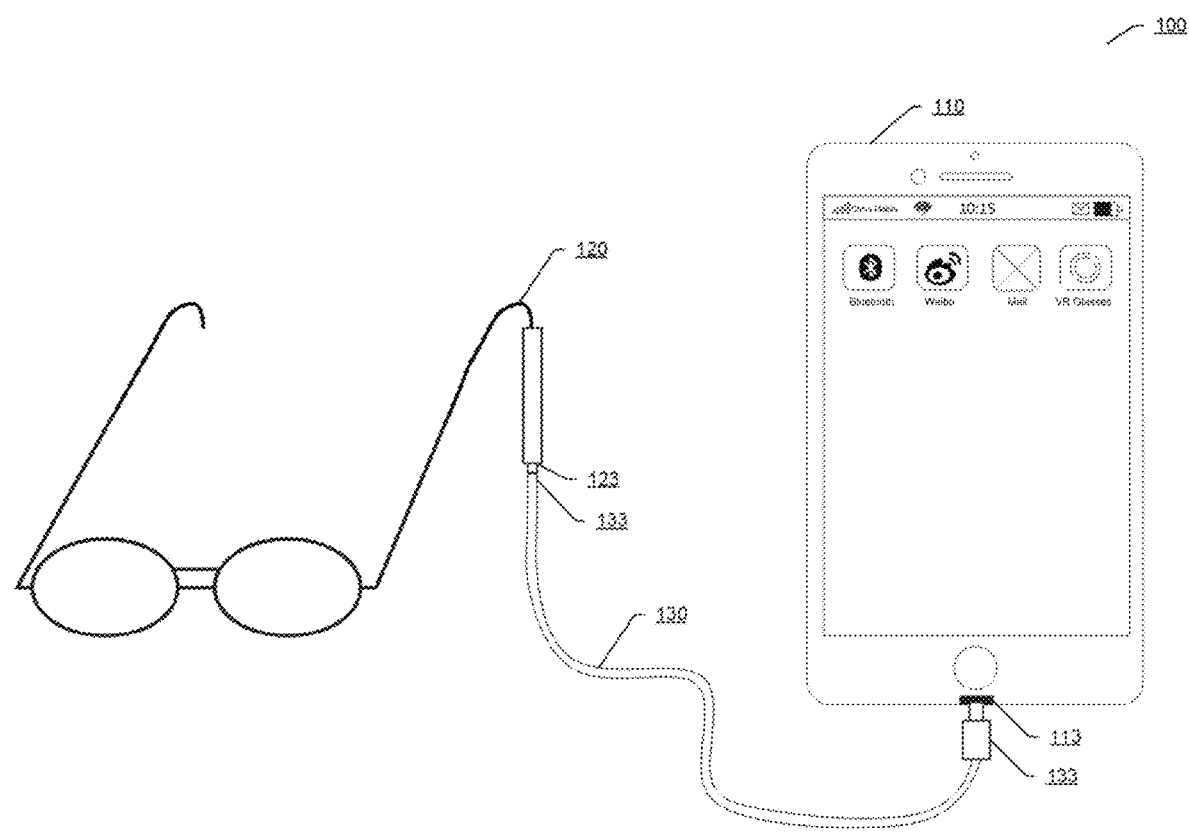
FIG. 1 shows a schematic diagram of a scenario in which a mobile phone is connected to a pair of smart glasses.

110: mobile phone
113: mobile phone interface
120: smart glasses
123: smart glasses interface
130: cable
133: cable interface
200: mobile power supply
210: peripheral interface
230: interface processing circuit
231: control strategy determining circuit
233: voltage adjusting circuit
235: data communication channel switching circuit
250: control circuit
260: integrated component
270: power supply circuit
275: battery circuit
275-1: battery pack
275-2: charging circuit
275-4: type-c receptacle
1100: electronic device
1110: processor
1120: memory
1130: internal storage
1140: communication interface
1150: bus

DETAILED DESCRIPTION

The subject described herein will be discussed below with reference to example embodiments. It should be understood that the discussion of these embodiments is only to enable those skilled in the art to better understand and implement the subject described herein, and is not to limit the scope, applicability or examples set forth in the claims. The functions and arrangements of the discussed elements may be changed without departing from the scope of the description. Various examples may omit, replace or add various processes or components as needed. In addition, features described with respect to some examples may also be combined in other examples.

As used herein, the term "including" and its variants represents open terms, meaning "including but not limited to." The term "based on" represents "based at least in part on." The terms "one embodiment" and "an embodiment" represent "at least one embodiment." The term "another embodiment" represents "at least one other embodiment." The terms "first", "second", etc. may refer to different or the same objects. Other definitions can be included below, either explicit or implicit. The definition of a term is consistent throughout the description, unless clearly indicated in the context.

As used herein, the term "connection" refers to direct mechanical connection, communication or electrical connection between two components (or units), or indirect mechanical connection, communication or electrical connection through intermediate components, and there may be electrical communication between the two connected components for data/information exchange. The connection may be implemented in a wired manner.

A smart glasses system includes smart glasses and a master control device, and the smart glasses are used in conjunction with the master control device. The smart glasses may be connected to the master control device (such as a computer, mobile phone, etc.) through a wired manner (such as a cable). The master control device may provide the smart glasses with display data for constructing virtual objects, and the smart glasses can display the virtual objects based on the data. It takes smart glasses and mobile phone as examples and describe in detail with reference to FIG. 1 as following.

FIG. 1 shows a schematic diagram of a scenario in which a mobile phone 110 is connected to a pair of smart glasses 120. As shown in FIG. 1, the mobile phone 110 is provided with a mobile phone interface 113 that may be used for power reception, power supplying, data communication, etc. The smart glasses 120 are provided with a smart glasses interface 123 that may be used for power reception, data communication, etc. Both ends of a cable 130 are provided with a cable interface 133 that may be used for power transmission, data communication, etc. The mobile phone interface 113, the smart glasses interface 123, and the cable interface 133 are all type-c interfaces.

After the mobile phone 110 is connected to the smart glasses 120 through the cable 130, the mobile phone 110 performs data communication with the smart glasses 120 through the cable 130, e.g., the mobile phone 110 can send display data for displaying virtual objects, communication signal data, etc. to the smart glasses 120 through the cable 130, and the mobile phone 110 can also supply power to the smart glasses 120 through the cable 130. Power supplying and data communication can be performed simultaneously.

However, the battery in the mobile phone 110 has limited energy storage, which limits the battery life of the mobile phone 110 as a power supply source. However, when the smart glasses 120 are in use, the smart glasses 120 and the mobile phone 110 consume relatively high power as a system, resulting in poor battery life both of the mobile phone 110 and the smart glasses 120.

In order to solve the problems described above, the present disclosure provides a mobile power supply and a method for supplying power to a peripheral device. The mobile power supply includes a first peripheral interface and a second peripheral interface, a first group of interface processing circuits and a second group of interface processing circuits, a control circuit, and a power supply circuit. A control strategy determining circuit of each group of interface processing circuits is used to determine a voltage adjustment strategy according to a power supply status information of the corresponding peripheral interface, and the control circuit is used to control a voltage adjusting circuit of an interface processing circuit to adjust voltage output by the power supply circuit according to a voltage adjustment strategy, to supply power with the adjusted voltage to a peripheral device coupled to the peripheral interface via the power supply terminal. The mobile power supply, when electrically connected to the peripheral device via the power supply terminal of the peripheral interface, can supply power to the peripheral device, and data terminals of the first peripheral interface and the second peripheral interface provide the peripheral device with a data communication channel.

The mobile power supply and method for supplying power to a peripheral device according to the present disclosure are described in detail below in conjunction with the accompanying drawings.

Figure 2:
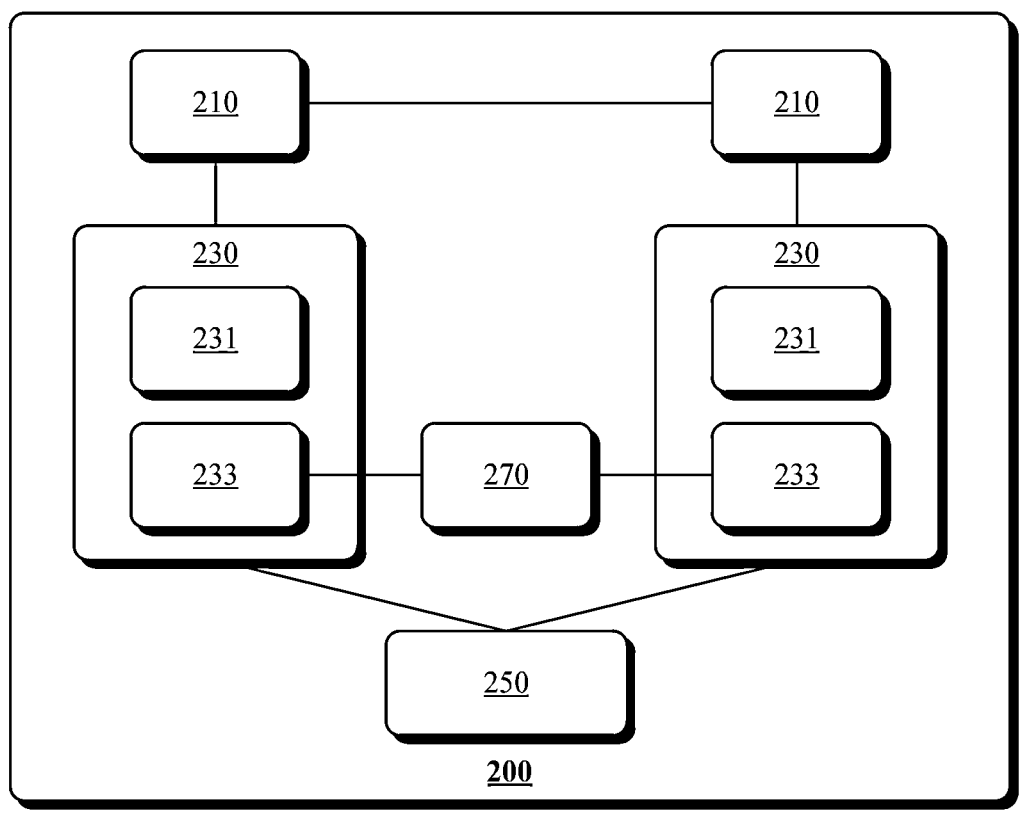
FIG. 2 shows a block diagram of a mobile power supply of an example of an embodiment of the present disclosure.

FIG. 2 shows a block diagram of a mobile power supply 200 of an example of an embodiment of the present disclosure.

A mobile power supply 200 can include two peripheral interfaces 210, two groups of interface processing circuits 230, a control circuit 250, and a power supply circuit 270. It should be noted that the mobile power supply 200 can include at least two peripheral interfaces 210 and at least two groups of interface processing circuits 230. As shown in FIG. 2, the mobile power supply 200 includes two peripheral interfaces 210, namely, a first peripheral interface and a second peripheral interface, and the first peripheral interface and the second peripheral interface can be the same peripheral interface. The mobile power supply 200 includes two groups of interface processing circuits 230, namely, a first group of interface processing circuits and a second group of interface processing circuits. FIG. 2 only shows an example of the mobile power supply 200, and the following description is also applicable to the case where the number of peripheral interfaces 210 included in the mobile power supply 200 is greater than two and the number of interface processing circuits 230 included in the mobile power supply 200 is greater than two. The mobile power supply 200 is described in detail below in conjunction with FIG. 2.

In an example of the present disclosure, the mobile power supply 200 can be portable.

In the present disclosure, interface processing circuits 230 are in one-to-one correspondence with peripheral interfaces 210, and each group of the interface processing circuits 230 is electrically connected to the corresponding peripheral interface 210 and a control circuit 250. A power supply circuit 270 is electrically connected to a voltage adjusting circuit 233.

For the peripheral interface 210, in an example, the peripheral interface 210 can be a type-c interface, that is, the first peripheral interface and the second peripheral interface are both type-c interfaces. Accordingly, an interface of a peripheral device also can be a type-c interface, and a cable used to connect a peripheral device and the peripheral interface 210 is also a type-c-type-c cable.

The type-c interface includes a type-c receptacle and a type-c plug, the type-c receptacle and the type-c plug correspond, and the type-c plug is plugged into the type-c receptacle for connection.

FIG. 3(a) shows a schematic diagram of pin configuration of a type-c receptacle of an example. The schematic is from the outside-in view of the receptacle. As shown in FIG. 3(a), "GND" represents the ground pin, and "VBUS" represents the bus power supply pin. "TX1+", "TX1−", "TX2+", "TX2−", "RX1+", "RX1−", "RX2+" and "RX2−" all represent data transmission pins. "CC1" and "CC2" represent the detection and communication pins, which are used to detect the interface insertion direction of the plug and receptacle, as well as the upstream and downstream role types of the type-c interface, and to implement the communication in comply with the PD protocol, where the interface insertion direction includes the forward insertion direction and the reverse insertion direction. "SBU1" and "SBU2" represent multiplexed pins, which can be multiplexed into other ports. "D+" and "D−" represent data transmission pins compatible with the USB2.0 protocol.

FIG. 3(b) shows a schematic diagram of pin configuration of a type-c plug of an example. The schematic is from the outside-in view of the plug. As shown in FIG. 3(b), the "$V_{CONN}$" pin is used to supply power to the chip in the cable. The "CC" pin may determine the interface insertion direction according to the connection to the "CC1" pin or the "CC2" pin.

A1, . . . , A12 and B1, . . . , B12 in FIGS. 3(a) and 3(b) described above all represent identifications of the pins.

Both a first peripheral interface and a second peripheral interface can have a data terminal and a power supply terminal. The power supply terminal is used for power transmission, and the data terminal can be used to transmit data, e.g., video data, audio data, etc. In an example, the data terminal also can be used to transmit interface status information. In an example, the data terminal of the first peripheral interface also can be used to output interface status information of the first peripheral interface, and the data terminal of the second peripheral interface also can be used to output interface status information of the second peripheral interface. In this example, the interface status information can be implemented by a software module with corresponding function. The interface status information can include power-supplying status information, which also can be implemented by a software module.

In another example, each peripheral interface also can have an interface status information terminal. In an example, a first peripheral interface and a second peripheral interface also have an interface status information terminal, and the interface status information terminal is used to output interface status information of the corresponding peripheral interface, the interface status information can include power-supplying status information.

The power-supplying status information is used to indicate whether there is a need to supply power to the peripheral device, and the power-supplying status information can include information indicating power supplying and information indicating no power supplying. In an example, information indicating power supplying can include DFP (Downstream Facing Port) information. When a peripheral interface 210 is determined to be a DFP, a mobile power supply 200 is a host terminal, and the mobile power supply 200 can act as a power supply source to supply power to a peripheral device.

The information indicating no power supplying can be based on a request from a peripheral device, when the peripheral device requests no power supplying, a mobile power supply 200 does not supply power to the peripheral. For the mobile power supply 200, in an example, when a peripheral device interface 210 is determined to be a UFP (Upstream Facing Port), it indicates that the mobile power supply 200 does not need to supply power to peripheral devices. In another example, a peripheral interface 210 is determined to be a DFP, and a control circuit 250 can cause the voltage adjusting circuit to not supply power to the peripheral device.

Power-supplying status information corresponding to a peripheral interface 210 can be fixed DFP information, and a mobile power supply 200 connected to the peripheral interface 210 acts as a power supply source. The power-supplying status information corresponding to the peripheral interface 210 can be DFP information, or can be UFP information, at this point, the peripheral interface 210 is a DRP (Dual Role Port), and the mobile power supply 200 of the peripheral interface 210 can be used as both a power supply source and a power receiving terminal.

Taking a peripheral interface 210 being a type-c interface as an example, for a device whose power-supplying status information indicates DFP, CC1 and CC2 of the peripheral interface 210 are set to be connected to a pull-up resistor $R_p$. For a device whose power-supplying status information indicates UFP, CC1 and CC2 of the peripheral interface 210 are set to be connected to a pull-down resistor $R_d$. For a DRP device, CC1 and CC2 of the peripheral interface 210 are set to be connected to a pull-up resistor $R_p$ and a pull-down resistor $R_d$, which can be switched between the pull-up resistor $R_p$ and the pull-down resistor $R_d$, and when switched to the pull-up resistor $R_p$, the device can act as a DFP device, and when switched to the pull-down resistor $R_d$, the device can act as a UFP device. The pull-up resistor $R_p$ and the pull-down resistor $R_d$ can be specified, e.g., the pull-up resistor $R_p$ is 56K ohms, and the pull-down resistor $R_d$ is 5.1K ohms.

When a peripheral interface 210 is electrically connected to a peripheral device with a cable, an interface of the cable includes a CC pin, and a mobile power supply 200 can detect a resistor connected to CC1 or CC2 in the interface of the peripheral device through the CC pin of the cable, and if it is detected that the resistor of the peripheral device is the pull-down resistor $R_d$, it can be determined that the peripheral device is in UFP mode, and the mobile power supply 200 is a DFP.

In an example, CC1 and CC2 of a peripheral interface 210 can be configured to be connected to pull-up resistors $R_p$. In another example, CC1 and CC2 of a peripheral interface 210 are configured to be connected to a pull-up resistor $R_p$ and a pull-down resistor $R_d$, and connections can be switched. For example, when a mobile power supply 200 is connected to a peripheral device, CC1 and CC2 can be switched to be connected to the pull-up resistor $R_p$ under control of software.

It should be noted that the DFP and UFP described above are used for representing roles as power supplying and power receiving respectively to indicate a power supplying direction. In addition, DFP and UFP also can be used for representing roles as data master and data slave to indicate a direction of data transmission. DFP plays the role of data master, and it outputs data, while UFP plays the role of data slave, and it receives data. For example, when device A is electrically connected to device B through an interface for data transmission, if the interface is determined to be a DFP, device A plays the role of data master while device B plays the role of data slave, and device A outputs data to device B, and device B receives the data output from device A. If the interface is determined to be a UFP, device B plays the role of data master while device A plays the role of data slave, device B outputs data to device A, and device A receives the data output from device B.

In the present disclosure, a power supply terminal of a peripheral interface 210 is used to output or receive power, and when the power supply terminal outputs power, a mobile power supply 200 supplies power to the peripheral device, while when the power supply terminal receives power, the peripheral device can supply power to the mobile power supply 200.

In the present disclosure, data terminals between respective peripheral interfaces 210 are electrically connected to establish a data transmission channel between respective peripheral interfaces for data transmission. In an example, a data terminal of a first peripheral interface is electrically connected to a data terminal of a second peripheral interface to establish a data transmission channel. The data transmission channel formed by the electrical connection between the data terminal of the first peripheral interface and the data terminal of the second peripheral interface can be used for data transmission. In an example, the channel between data terminals can include a high-speed channel and a low-speed channel. The high-speed channel can be used for data transmission with high real-time requirements, e.g., DP data. The low-speed channel can be used for communication signal data transmission, etc.

Data that can be transmitted between peripheral interfaces 210 includes USB data, communication signal data, display data, etc. Among them, USB data is data supported by USB protocols such as USB2.0 and USB3.0, e.g., USB2.0 data, and USB2.0 data is the data whose transmission can be supported by the data line interface in comply with the USB2.0 protocol. The transmission of USB data and communication signal data can employ low-speed channels.

Display data includes DP (DisplayPort) data, as the DP data has high requirements on real-time performance, the transmission of DP data can be implemented by a high-speed channel with higher transmission efficiency to ensure the instantaneity of DP data.

In the present disclosure, a peripheral interface 210 can only supply power or only provide a data communication channel for a peripheral device, and can also supply power and provide a data communication channel for the peripheral device at the same time.

In an example, a peripheral interface 210 also can implement forward and reverse insertion. For example, if the peripheral interface 210 is a receptacle, a plug can be forwardly inserted into the receptacle or reversely inserted into the receptacle, and the connection can be implemented by both insertion methods. Through the implementation of forward and reverse insertion in this example, the user can insert arbitrarily during use without first confirming the insertion direction, which improves user experience.

For an interface processing circuit 230, in an example, a mobile power supply 200 includes a first group of interface processing circuits and a second group of interface processing circuits, each group of interface processing circuits 230 includes a control strategy determining circuit 231 and a voltage adjusting circuit 233.

The control strategy determining circuit 231 is configured to determine a voltage adjustment strategy of the voltage adjusting circuit 233 according to power-supplying status information. In an example, when the power-supplying status information is DFP information, the voltage adjustment strategy means that power is supplied to a peripheral device and the voltage adjusting circuit 233 adjusts the output voltage. When the power-supplying status information is UFP information, it means that there is no need to supply power to the peripheral device, and the voltage adjustment strategy means that the voltage adjusting circuit 233 does not output voltage at this point.

A voltage adjusting circuit 233 is electrically connected to a power supply circuit 270, and an output of the power supply circuit 270 is electrically connected to an input of the voltage adjusting circuit 233. The voltage adjusting circuit 233 can adjust voltage output by the power supply circuit 270.

In an example, a voltage adjusting circuit 233 can employ a buck/boost circuit. In an example, the voltage adjusting circuit 233 can employ a chip of the type NCP81239.

For a control circuit 250, the control circuit 250 and a control strategy determining circuit 231 are in communication connection, and the way of communication connection can be electrical connection. The control strategy determining circuit 231 can notify the control circuit 250 of the determined rated voltage adjustment strategy.

A control circuit 250 is configured to cause a voltage adjusting circuit 233 to adjust voltage output by a power supply circuit 270 according to a voltage adjustment strategy, to supply power with the adjusted voltage to a peripheral device coupled to a peripheral interface 210 via a power supply terminal.

For a power supply circuit 270, in an example of the present disclosure, the power supply circuit can include a power conversion circuit for providing a regulated voltage in a mobile power supply. The regulated voltage in the mobile power supply can include the rated voltage of a circuit or component in the mobile power supply. The voltage provided by the power conversion circuit is a voltage obtained by performing voltage conversion on the input voltage of the power conversion circuit. The input voltage of the power conversion circuit can be derived from an external power supply, at this point, the input of the power conversion circuit is electrically connected to the output of the external power supply. The input voltage of the power conversion circuit also can be derived from the battery voltage in the mobile power supply, at this point, the input of the power conversion circuit is electrically connected to the output of the battery.

In an example, a power conversion circuit is a buck circuit, and the power conversion circuit can convert the supply voltage of an external power supply into a regulated voltage in a mobile power supply.

In an example of the present disclosure, a power supply circuit can further include a battery circuit, which includes a battery, and the capacity of the battery include be configured. The battery circuit can be used to store energy and output power to a peripheral device. The output of an external power supply is electrically connected to the input of the battery circuit, and the external power supply can charge the battery in the battery circuit for energy storage. When there is a need for a mobile power supply to supply power to the peripheral device, the battery circuit outputs voltage.

In an example, an output of the battery circuit also can be electrically connected to a control circuit 250, a voltage adjusting circuit 233, a data communication channel switching circuit 235, and other circuits or components in a mobile power supply 200 through a voltage adjustment module, and the voltage adjustment module can adjust the voltage output by the battery circuit to the rated voltage of each circuit or component, to meet the power supplying requirement for each circuit or component.

In an example, a battery circuit can include a battery pack, a charging circuit, and a charging power supply control circuit. The battery pack is electrically connected to the charging circuit, and the charging circuit is also electrically connected to the charging power supply control circuit.

A battery pack can include a plurality of battery cells, and parameters such as rated voltage, rated current, power, battery capacity, and battery internal resistance of respective battery cells can be the same. The connection modes of the battery cells in the battery pack can include series connection, parallel connection, and hybrid series-parallel connection. The connection mode of the battery cells in the battery pack can be determined according to factors such as the battery pack volume and output power. For example, the battery cells in the battery pack can form a connection mode of two cells in series and two cells in parallel.

A charging circuit can include a power supply terminal and a control terminal, and the charging circuit can be electrically connected to a battery pack through the power supply terminal to charge the battery pack. The charging circuit also can be communicatively connected to the battery pack through the control terminal, so as to balance the power of each battery cell in the battery pack.

A charging circuit can communicate with each battery cell in a battery pack through a control terminal, and the charging circuit can detect the power of each connected battery cell through a communication connection line, and control the charging for each battery cell according to the power of each battery cell. Specifically, when the charging circuit is charging the battery pack, the charging circuit can detect the charging status of each battery cell in real time, and if it is detected that a charging cell is fully charged, charging the charging cell can be stopped. While other battery cells that are not fully charged are not affected, the charging circuit continues to charge the battery cells that are not fully charged until the battery cells are fully charged.

In an example where a charging circuit detects the battery power of each battery cell, the charging circuit pre-collects battery property parameters of each battery cell, such as battery capacity, voltage, current, battery internal resistance, etc. Then, the calculation is performed based on the battery property parameters of each battery cell, so as to obtain the correlation between the voltage and the amount of power of the battery. The charging circuit detects the voltage of each battery cell in real time, and then obtains the real-time amount of power of each battery cell based on the real-time voltage and the obtained correlation between the voltage and the amount of power.

A charging circuit can be a DC/DC voltage conversion circuit, and the communication connection between the charging circuit and a battery pack can use an I2C bus. In addition, a control circuit can be in communication connection with the charging circuit to control the charging circuit, and the way of communication connection can include an I2C bus connection.

An electric energy output terminal of a charging power supply control circuit is electrically connected to an electric energy input terminal of a charging circuit, and an electric energy input terminal of the charging power supply control circuit can be electrically connected to a charging power supply, which is a power supply outside a mobile power supply and can be electrically connected to the mobile power supply to charge the mobile power supply.

The charging power supply control circuit is configured to convert the output electric energy of the charging power supply into electric energy conforming to the specifications of the rated voltage, rated current, and rated power of the mobile power supply, and output the converted electric energy to the charging circuit.

In an example, a charging power supply control circuit can include a PD controller and a receptacle, which can include a type-c receptacle. In this example, the PD controller is electrically connected to the receptacle, and the receptacle can be electrically connected to the charging power supply, and the electric energy output terminal of the receptacle is electrically connected to the electric energy input terminal of the charging circuit. When the receptacle is a type-c receptacle, the PD controller is connected to the data transmission pins "D+", "D−" as well as the detection and communication pins "CC1" or "CC2" of the type-c receptacle, and the bus power supply pin "VBUS" of the type-c receptacle is electrically connected to the electric energy input terminal of the charging circuit. In addition, a control circuit in a mobile power supply can be in communication connection with the PD controller to implement control of the PD controller, and the way of communication connection can include an I2C bus connection.

Through the pins "D+", "D−" and "CC1" or "CC2", the PD controller can detect whether there is a charging power supply connected to the type-c receptacle, and when it is detected that a charging power supply is connected, the electric energy output capability of the charging power supply, e.g., output power, current, voltage, etc., can be further detected. Then, the output electric energy of the charging power supply is converted according to the detected electric energy output capability of the charging power supply. For example, the charging power supply connected to the type-c receptacle outputs electric energy with 15V, 2 A, while the rated voltage of the mobile power supply is 8V, the rated current is 2 A, and the rated power is 16 W, then the PD controller controls and converts the electric energy with 15V and 2 A output by the charging power supply into the electric energy with 8V, 2 A and 16 W.

Figures 3, 4:
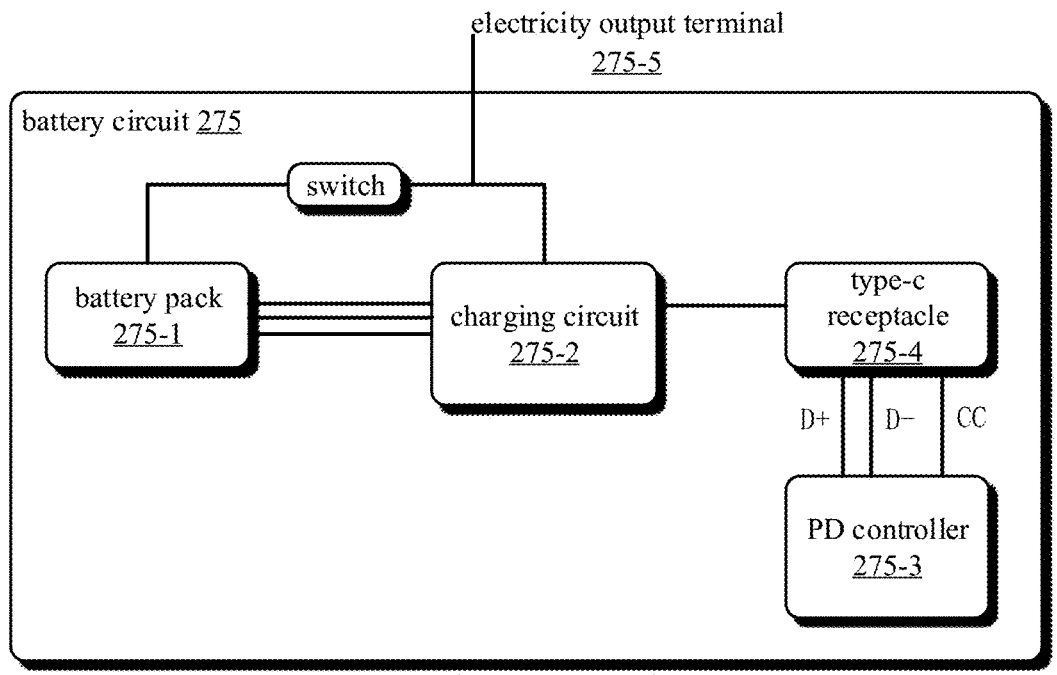
FIG. 4 shows a schematic diagram of a battery circuit of an example of an embodiment of the present disclosure.

FIG. 4 shows a schematic diagram of a battery circuit of an example of an embodiment of the present disclosure. As shown in FIG. 4, a battery circuit 275 includes a battery pack 275-1, a charging circuit 275-2, a PD controller 275-3, and a type-c receptacle 275-4. The battery pack 275-1 and the charging circuit 275-2 are electrically connected through a switch, and the electrical connection is used for transmission of electrical energy. In addition, the battery pack 275-1 and the charging circuit 275-2 are communicatively connected (three connection lines shown in FIG. 4), and the charging circuit 275-2 is electrically connected to the type-c receptacle 275-4, the PD controller 275-3 and the type-c receptacle 275-4 are communicatively connected through the pins "D+", "D−" and the "CC" of the cable, the "CC" of the cable is connected to pin "CC1" or "CC2" in the type-c receptacle 275-4.

The electric energy output terminal 275-5 shown in FIG. 4 is the port of the battery circuit 275, and the battery circuit 275 supplies power to other circuits or components in a mobile power supply and a peripheral device through the electric energy output terminal 275-5. The electric energy output terminal 275-5 can be electrically connected to a power conversion circuit, and supply power to other circuits or components in the mobile power supply through the power conversion circuit. The electric energy output terminal 275-5 also can be electrically connected to the voltage adjusting circuit 233 in FIG. 2, and supply power to the peripheral device through the voltage adjusting circuit.

As shown in FIG. 4, an end of a switch is electrically connected to a power supply terminal of the battery pack 275-1, and the power supply terminal can be used for the charging circuit 275-2 to charge the battery pack 275-1, and also can be used for the battery pack 275-1 to supply power to the outside. The electric energy output terminal 275-5 of the battery circuit 275 is electrically connected to the power supply terminal of the battery pack 275-1 and the electric energy output terminal of the charging circuit 275-2, based on this connection, the battery pack 275-1 can supply power to the outside through the electric energy output terminal 275-5, and the external charging power supply connected to the charging circuit 275-2 also can supply power to the outside through the electric energy output terminal 275-5.

In an example, as shown in FIG. 4, a first end of a switch is electrically connected to a power supply terminal of a battery pack 275-1, and a second end is electrically connected to an electric energy output terminal of a charging circuit 275-2 and an electric energy output terminal of a battery circuit 275. The switch can be connected to a control circuit 250, and the connection can be an I2C bus connection, and the control circuit 250 can control the switch status of the switch.

When the type-c receptacle 275-4 is connected to an external charging power supply, the charging power supply can charge the battery pack 275-1 via the charging circuit 275-2, and at this point, the switch is in a closed status. During the charging process of the battery pack 275-1, the charging power supply can supply power via the charging circuit 275-2 and through the electric energy output terminal 275-5. When all the battery cells in the battery pack 275-1 are fully charged, the charging of the battery pack 275-1 can be stopped, at this point, the switch is open, and the charging power supply continues to supply power via the charging circuit 275-2 and the electric energy output terminal 275-5. When the charging power supply is disconnected from the type-c receptacle 275-4, the switch is closed, and the battery pack 275-1 supplies power via the switch and the electric energy output terminal 275-5.

Through the example described above, the source of power of the mobile power supply can have many options, which avoids the situation that there is only one source that is the battery pack, thus avoids using only the battery pack for power supplying all the time, and reducing the loss of the battery pack. When the mobile power supply is connected to an external charging power supply, the mobile power supply can be supplied with power by the external charging power supply, thereby power utilization of the battery pack is improved. Moreover, for the battery pack, external power supply can be avoided during the charging process, which improves the charging efficiency.

In an example of the present disclosure, a power supplying and communication system includes a mobile power supply 200, a first peripheral device, and a second peripheral device described above. The mobile power supply 200 is electrically connected to the first peripheral device via a first peripheral interface, and is electrically connected to the second peripheral device via a second peripheral interface.

The mobile power supply 200 can supply power to the first peripheral device via the first peripheral interface, and can supply power to the second peripheral device via the second peripheral interface; and the mobile power supply 200 can provide a data transmission channel via the first peripheral interface and the second peripheral interface to enable data transmission between the first peripheral device and the second peripheral device.

In an example, the first peripheral device can include a head-mounted display device, the second peripheral device can include a master control device for controlling the head-mounted display device, and the master control device can include terminal devices that can perform control operations, such as a mobile phone, a tablet, and a computer, and the head-mounted display device can include smart glasses using virtual reality technology, e.g., AR glasses, VR glasses, XR glasses, etc. For example, the smart glasses and the mobile phone are electrically connected to a mobile power supply 200 at the same time as peripheral devices, and the mobile power supply 200 can supply power to the smart glasses and the mobile phone, and provide a data transmission channel to enable data communication between the at least two peripheral devices.

Figure 5:
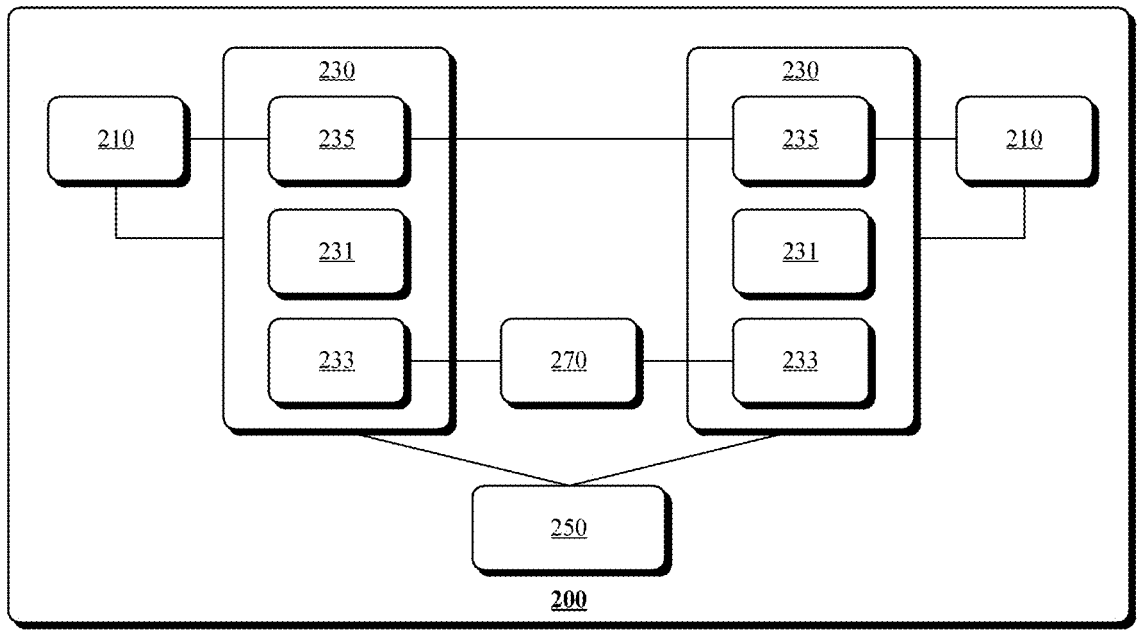
FIG. 5 shows a block diagram of a mobile power supply of an example of another embodiment of the present disclosure.

FIG. 5 shows a block diagram of a mobile power supply 200 of an example of another embodiment of the present disclosure.

As shown in FIG. 5, each group of interface processing circuits 230 can further include a data communication channel switching circuit 235, and data terminals of respective peripheral interfaces 210 are electrically connected via the data communication channel switching circuits 235 of the peripheral interfaces where the data terminals are located to establish data transmission channels. In an example, the data terminal of the first peripheral interface is electrically connected to the data terminal of the second peripheral interface via the data communication channel switching circuit corresponding to the first peripheral interface and the data communication channel switching circuit corresponding to the second peripheral interface, to establish a data transmission channel.

A plurality of data communication channels can be formed between the data communication channel switching circuits 235, and the data communication channel switching circuits 235 can switch the data communication channels by means of channel switching.

In an example of this specification, interface status information can further include device insertion direction indication information, and the device insertion direction indication information is used to indicate the insertion direction of the interface connected to a peripheral interface relative to the peripheral interface. The control strategy determining circuit can be configured to determine a channel switching control strategy of the data communication channel switching circuit according to the device insertion direction indication information. In an example, there may be a one-to-one correspondence between the device insertion direction indication information and the channel switching control strategy.

A control circuit is configured to cause a data communication channel switching circuit to perform data communication channel switching according to a channel switching control strategy, so that peripheral devices establish data transmission channels via respective data terminals to implement data communication.

In the present disclosure, the insertion direction of a peripheral device plugged into a peripheral interface includes a forward insertion direction and a reverse insertion direction. The insertion direction of the interface is described below in conjunction with the pin identifications in FIGS. 3(a) and 3(b). When the pin in the plug has the same identification as the pin in the corresponding receptacle, it indicates the forward insertion direction. For example, when the A1 pin in the receptacle is connected to the A1 pin in the plug correspondingly, it is the forward insertion direction. When the identification of the pin in the plug is different from that of the corresponding pin in the receptacle, e.g., when the A1 pin in the receptacle is correspondingly connected to the B1 pin in the plug, it indicates the reverse insertion direction.

In an example of the present disclosure, a first peripheral interface and a second peripheral interface are both type-c interfaces, and a device insertion direction indication information can be characterized by the name of a terminal of the peripheral interface that provides power-supplying status information. The interface status information terminals of the peripheral interface 210 include CC1 and CC2, and CC1 and CC2 are respectively used to characterize insertion directions.

When a peripheral device is connected to the peripheral interface 210, it is detected whether the CC pin is connected to the CC1 pin or the CC2 pin. When the CC pin is correspondingly connected to the CC1 pin, the device insertion direction indication information is CC1, and the indicated direction is the forward insertion direction. When the CC pin is correspondingly connected to the CC2 pin, the device insertion direction indication information is CC2, and the indicated direction is the reverse insertion direction.

Figure 6:
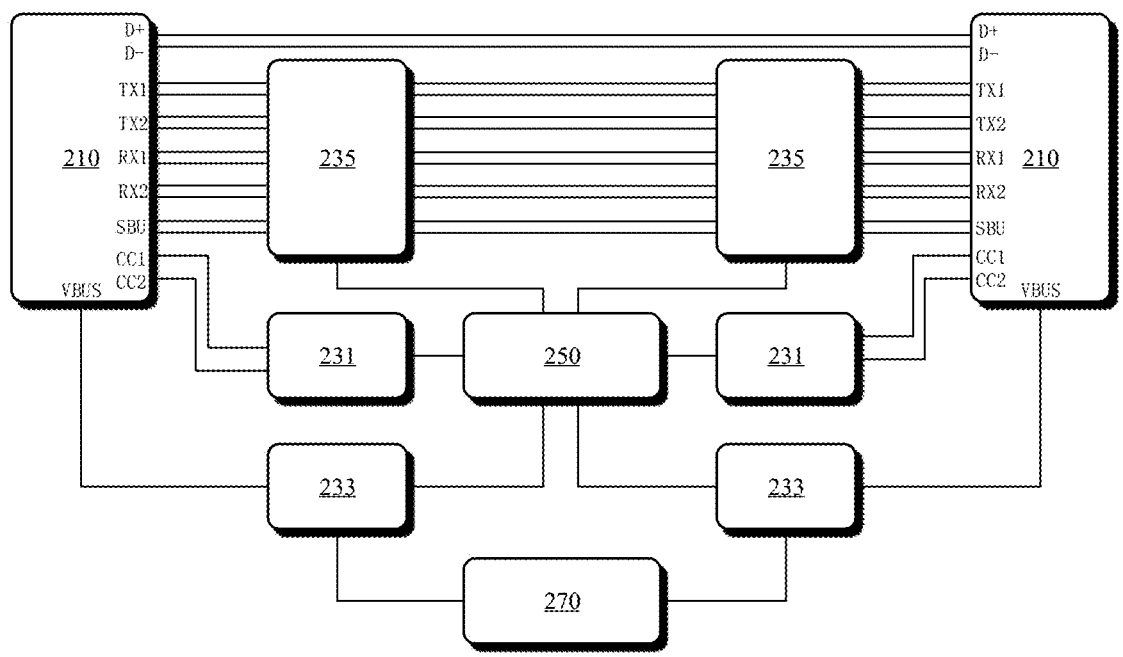
FIG. 6 is a diagram illustrating component connection of a mobile power supply of an example of an embodiment of the present disclosure.

FIG. 6 is a diagram illustrating component connection of a mobile power supply of an example of an embodiment of the present disclosure. A peripheral interface 210 shown in FIG. 6 is a type-c interface, and it should be noted that it is only an example that the peripheral interface 210 is a type-c interface, and the peripheral interface 210 also can be other types of interfaces with corresponding functions. For example, the components and circuits included in the mobile power supply 200 conform to the relevant specifications and requirements of the type-c interface, and the at least two peripheral interfaces 210 included in the mobile power supply 200 are interfaces conforming to other specifications, and the components and circuits included in the mobile power supply 200 are electrically connected to the peripheral interfaces 210 after corresponding conversion.

The following takes the type-c interface as an example for description.

As shown in FIG. 6, a control circuit 250 is electrically connected to a control strategy determining circuit 231, a voltage adjusting circuit 233, and a data communication channel switching circuit 235 in each group of interface processing circuits 230. The interface status information terminals of a peripheral interface 210 include CC1 and CC2, the data terminals include D+, D−, TX1, TX2, RX1, RX2 and SBU, and the power supply terminal includes VBUS.

The two peripheral interfaces 210 are used for USB2.0 data transmission through the channel formed by the direct connection of D+ and D−. Using this channel, it can be compatible with the data in comply with the USB2.0 protocol, and the data communication capability of the mobile power supply is improved.

The control strategy determining circuit 231 in each group of interface processing circuits 230 is electrically connected to CC1 and CC2 of the peripheral interface 210. In an example, a control circuit 250 is connected to a control strategy determining circuit 231 through an I2C bus. In another example, a switch (not shown in the drawings) is provided between a control strategy determining circuit 231 and CC1 as well as CC2 of a peripheral interface 210, and the control strategy determining circuit 231 is electrically connected to CC1 and CC2 through the switch, and the switch is communicatively connected to a control circuit 250, and the control circuit 250 can control the status of the switch. When the CC1 and CC2 ports need to reach zero level, the control circuit 250 can cause the switch to be opened so that the CC1 and CC2 ports reach zero level.

A data communication channel switching circuit 235 in each group of interface processing circuits 230 is electrically connected to TX1, TX2, RX1, RX2 and SBU. Among them, TX1 includes TX1+ and TX1−, TX2 includes TX2+ and TX2−, RX1 includes RX1+ and RX1−, and RX2 includes RX2+ and RX2−. SBU includes SBU1 and SBU2. The channel formed by TX1, TX2, RX1 and RX2 is a high-speed channel, and the channel formed by the SBU is a low-speed channel, and the low-speed channel may be used for transmission of communication signal data.

In an example, when a mobile power supply 200 is electrically connected to a peripheral device via a peripheral interface 210, a control circuit 250 causes a voltage adjusting circuit 233 to supply power to the peripheral device, and based on the insertion direction of the peripheral device, the control circuit 250 causes a data communication channel switching circuit 235 to switch the corresponding data communication channel. After completing the channel switching, the control circuit 250 notifies the peripheral device that data transmission can be performed through the channel between the data communication channel switching circuits 235.

Figure 7:
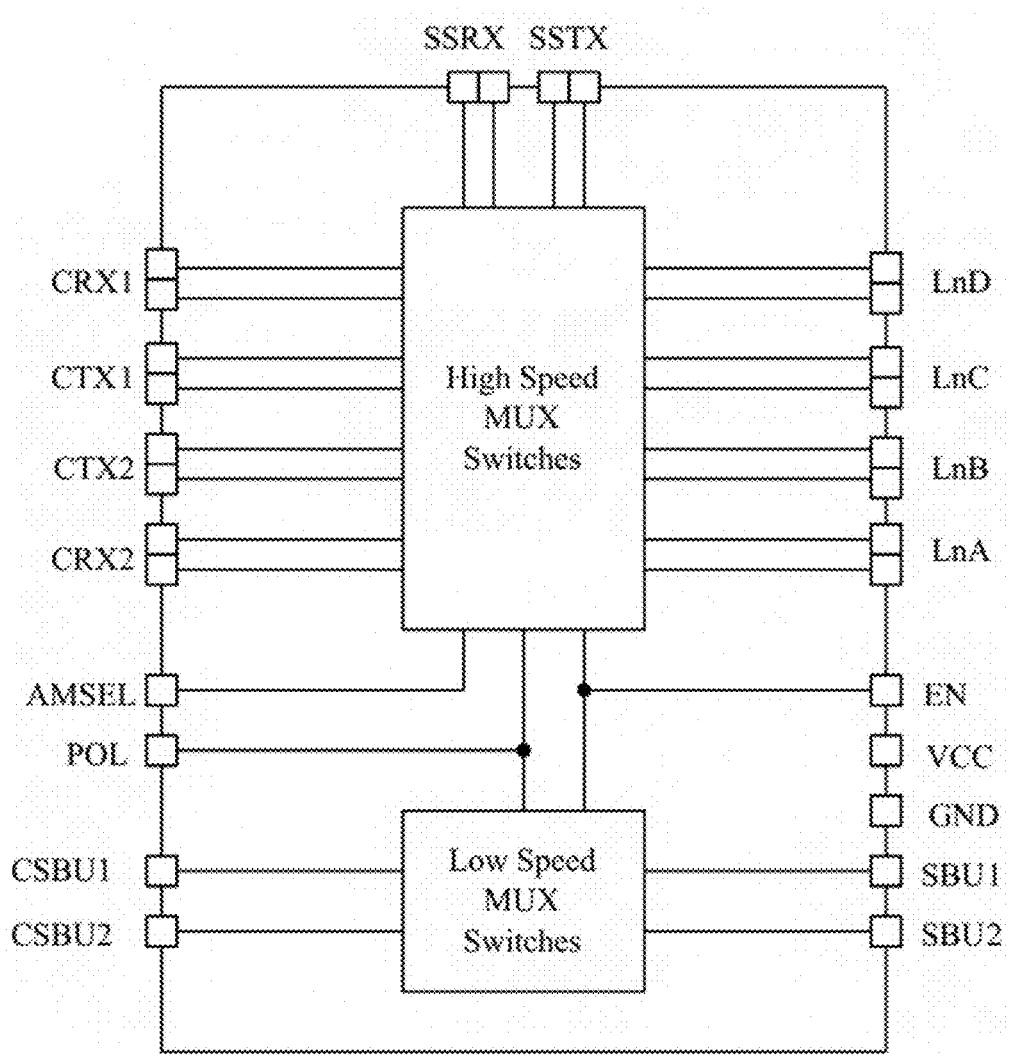
FIG. 7 shows a circuit diagram of a data communication channel switching circuit of an example of an embodiment of the present disclosure.

FIG. 7 shows a circuit diagram 700 of a data communication channel switching circuit 235 of an example of an embodiment of the present disclosure. The data communication channel switching circuit 235 shown in FIG. 7 employs a chip of the type HD3SS460. The connections between the data communication channel switching circuit 235 and a corresponding peripheral interface 210 includes: the connection between TX1 and CTX1, the connection between TX2 and CTX2, the connection between RX1 and CRX1, the connection between RX2 and CRX2, the connection between SBU and CSBU1 as well CSBU2.

Each data communication channel switching circuit 235 is electrically connected to a control circuit 250. In an example, the control circuit 250 is electrically connected to the data communication channel switching circuit 235 through a I2C bus, and the data communication channel switching circuit 235 can be controlled through the I2C bus.

In another example, a control circuit 250 is electrically connected to a POL control pin and an AMSEL control pin of a data communication channel switching circuit 235. The control circuit 250 inputs high and low levels to the POL control pin and the AMSEL control pin to control the data communication channel switching circuit 235, and the levels of the POL control pin and the AMSEL control pin are different, thus different channels can be enabled.

For example, a data communication channel switching circuit 235 employs the HD3SS460 type chip. When a low level is input into a POL pin and a high level is input into an AMSEL pin, a four-channel mode is enabled. When a low level is input into the POL pin and a low level is input into the AMSEL pin, a USBSS channel and a two-channel mode are enabled. When a low level is input into the POL pin and a medium level is input into the AMSEL pin, a USBSS channel mode is enabled.

A voltage adjusting circuit 233 in each group of interface processing circuits 230 is electrically connected to the VBUS for adjusting the voltage on the VBUS. In an example, a control circuit 250 is electrically connected to the voltage adjusting circuit 233 through a I2C bus, so as to control the voltage adjusting circuit 233 through the I2C bus. In another example, a switch (not shown in the drawings) is provided between the voltage adjusting circuit 233 and VBUS, and the voltage adjusting circuit 233 is electrically connected to the VBUS through the switch, and the switch is communicatively connected to the control circuit 250, and the control circuit 250 can control the status of the switch. When a zero level is required on VBUS, the control circuit 250 can cause the switch to be opened so that the VBUS port reaches zero level.

In an example of the present disclosure, a control circuit 250 can be integrated with a control strategy determining circuit 231 in each group of interface processing circuits into a component, which can implement the functions of the control circuit 250 and the control strategy determining circuit 231.

In an example of the present disclosure, a control circuit 250 can be integrated with at least one of a control strategy determining circuit 231, a voltage adjusting circuit 233, and a data communication channel switching circuit 235, into one component.

Figure 8:
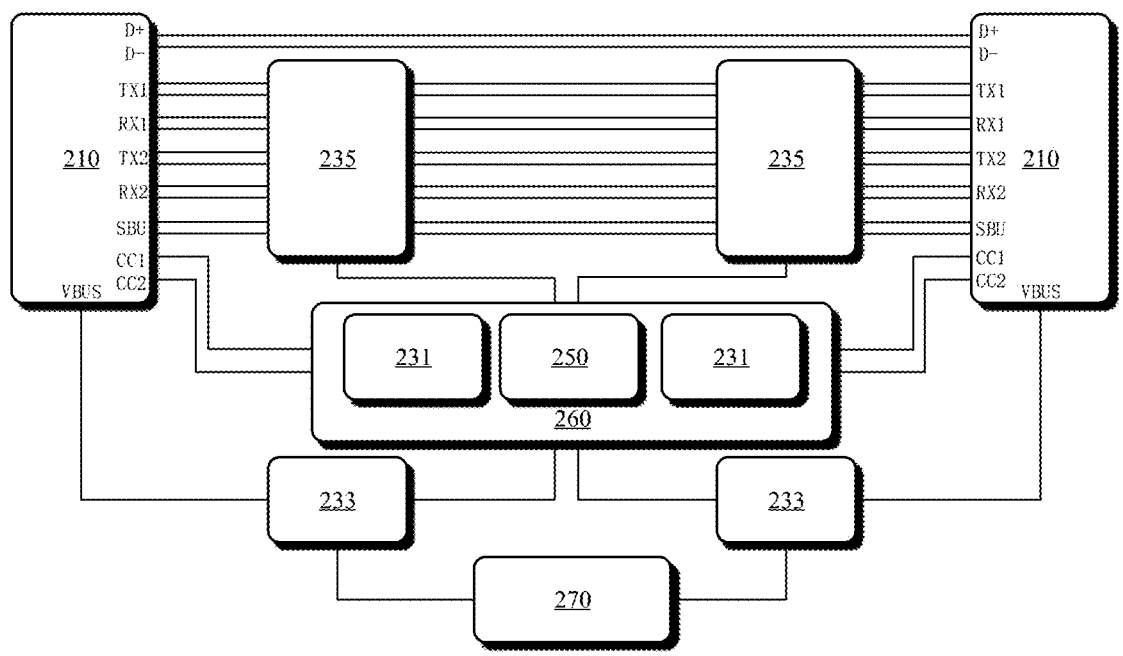
FIG. 8 is a diagram illustrating component connection of a mobile power supply of another example of an embodiment of the present disclosure.

Taking the control circuit 250 and the control strategy determining circuit 231 being integrated into one component as an example, FIG. 8 is a diagram illustrating component connection of a mobile power supply of another example of an embodiment of the present disclosure. As shown in FIG. 8, a control circuit 250 and a control strategy determining circuits 231 in each group of interface processing circuits are combined into a component 260, and the component 260 is electrically connected to a peripheral interface 210, a data communication channel switching circuit 235, and a voltage adjusting circuit 233.

In an example of the present disclosure, a control strategy determining circuit is configured to determine a channel switching control strategy of a data communication channel switching circuit according to a device insertion direction indication information. A control circuit is configured to cause the data communication channel switching circuit to perform data communication channel switching according to the channel switching control strategy, so that a peripheral device implements data communication via respective data terminals.

In this example, the channel switching control strategy is used to instruct the data communication channel switching circuit 235 to switch to the corresponding data communication channel. The data communication channel switching circuit 235 includes a channel switch, and the channel switch switches among different positions to correspond to different data communication channels. The insertion direction indicated by the device insertion direction indication information is in one-to-one correspondence with the channel switching control strategy, and the channel switching control strategy is in one-to-one correspondence with the position of the channel switch.

For example, the position of a channel switch preset by a data communication channel switching circuit is the position corresponding to a forward insertion direction, and when the direction indicated by the device insertion direction indication information is the forward insertion direction, the current channel switch position can be kept unchanged, while when the direction indicated by the insertion direction indication information is the reverse insertion direction, the channel switch can be switched to the position corresponding to the reverse insertion direction.

Figure 9:
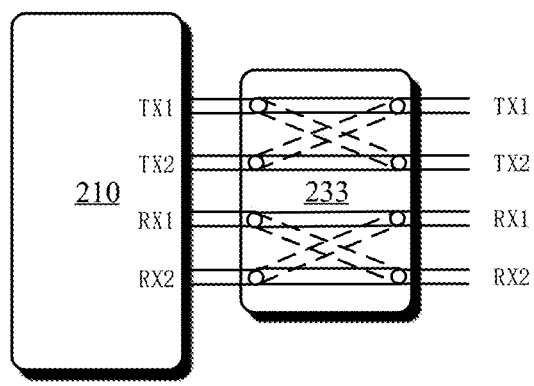
FIG. 9 shows a schematic diagram of a data communication channel switching circuit performing communication channel switching of an example of an embodiment of the present disclosure.

FIG. 9 shows a schematic diagram 900 of a data communication channel switching circuit 235 performing communication channel switching of an example of an embodiment of the present disclosure. As shown in FIG. 9, the data communication channel switching circuit 235 is connected to a peripheral interface 210, and the four channel switches in the data communication channel switching circuit 235 are: a channel switch corresponding to TX1, a channel switch corresponding to TX2, a channel switch corresponding to RX1, and a channel switch corresponding to RX2. The dashed line in the Figure indicates the switchable position of the channel switch. For example, the current position of the channel switch corresponding to TX1 is connected to TX1, and the channel switch can be switched to be connected to TX2.

The current position of each channel switch shown in FIG. 9 (indicated by the solid line) corresponds to the forward insertion direction, and the position shown by the dashed line corresponds to the reverse insertion direction. When the peripheral interface 210 and the interface connecting a peripheral device are in the forward insertion direction, TX1, TX2, RX1 and RX2 in the peripheral interface 210 correspond to TX1, TX2, RX1 and RX2 of the connected interface respectively, then the channel switch is placed in the position indicated by the solid line. When the peripheral interface 210 and the interface connecting the peripheral device are in the reverse insertion direction, TX1, TX2, RX1 and RX2 in the peripheral interface 210 correspond to TX2, TX1, RX2 and RX1 of the connected interface respectively, then the channel switch is placed in the position indicated by the dashed line.

In an example of the present disclosure, each group of interface processing circuits further includes a data communication channel switching circuit, and a data terminal of a first peripheral interface is electrically connected to a data terminal of a second peripheral interface via the data communication channel switching circuit corresponding to the first peripheral interface and the data communication channel switching circuit corresponding to the second peripheral interface.

In this example, a control strategy determining circuit can be configured to determine a channel switching control strategy of the data communication channel switching circuit according to the corresponding connection mode of the data terminal of the first peripheral interface and the data terminal of the second peripheral interface.

In this example, the data terminal includes a plurality of pins, and the pins of the data terminal of the first peripheral interface correspond to the pins of the data terminal of the second peripheral interface. The correspondence connection mode is the correspondence of the pins of the data terminals of the first peripheral interface and the pins of the data terminals of the second peripheral interface.

Taking FIG. 9 as an example, the pin "TX1" in a data terminal of a first peripheral interface and the pin "TX1" in a data terminal of a second peripheral interface are connected via the channel of TX1, then the correspondence connection mode at this point is corresponding. If the pin "TX1" in the data terminal of the first peripheral interface is connected to the TX2 channel, and the pin "TX1" in the data terminal of the second peripheral interface is connected to the TX1 channel, the correspondence connection mode at this time is non-corresponding and there is a need to switch to the corresponding connection channel.

For example, a data terminal of a first peripheral interface and a data terminal of a second peripheral interface are shown in FIG. 9, for the data terminal of the first peripheral interface, the preset position of a channel switch in a data communication channel switching circuit 235 is the position shown by the solid line in FIG. 9, and for the data terminal of the second peripheral interface, the preset position of another channel switch in another data communication channel switching circuit 235 is also the position shown by the solid line in FIG. 9, then the correspondence connection mode at this point is corresponding, and the channel switch positions in the two data communication channel switching circuits 235 can be kept unchanged. If for the data terminal of the first peripheral interface, the preset position of a channel switch in a data communication channel switching circuit 235 is the position shown by the solid line in FIG. 9, while for the data terminal of the second peripheral interface, the preset position of another channel switch in another data communication channel switching circuit 235 is the position shown by the dashed line in FIG. 9, then the correspondence connection mode at this point is non-corresponding, and at this time, the position of the channel switch in either one of the data communication channel switching circuits 235 corresponding to the first peripheral interface or the second peripheral interface can be switched.

In an example of the present disclosure, interface status information includes data communication indication information, and a control strategy determining circuit is configured to determine a channel switching control strategy of a data communication channel switching circuit according to a device insertion direction indication information, in response to that the data communication indication information indicates performance of data communication.

In this example, the data communication indication information is used to indicate that a peripheral device needs to perform data communication through the data communication channel provided by a mobile power supply 200.

A data communication indication information can be sent by a peripheral device. Specifically, the peripheral device, after connecting to a peripheral interface 210 of a mobile power supply 200, sends the data communication indication information to a control strategy determining circuit through the CC1 or CC2 pin of the peripheral interface 210, and the control strategy determining circuit, after receiving the data communication indication information, performs an operation of determining a channel switching control strategy of a data communication channel switching circuit according to a device insertion direction indication information.

In another example, a data communication indication information is a trigger condition for a control strategy determining circuit to perform an operation of determining a channel switching control strategy of a data communication channel switching circuit according to a device insertion direction indication information, and the control strategy determining circuit don't perform the operation of determining the channel switching control strategy of the data communication channel switching circuit according to the device insertion direction indication information without receiving the data communication indication information.

In an example of the present disclosure, interface status information can include power-supplying mode information. The power supplying mode can include a normal charging mode and a fast charging mode, and compared with the normal charging mode, the fast charging mode can provide greater charging power for a peripheral device, save charging time, and improve charging efficiency. For example, the charging voltage in the traditional charging mode is 5V, and the maximum charging current is 1.5 A. In the fast charging mode, the charging voltage can be 12V, and the charging current can be 3 A.

A power-supplying mode information can carry information used to characterize the normal charging mode or information used to characterize the fast charging mode. In an example, the power-supplying mode information carries charging voltage information and charging current information, and the charging voltage information and charging current information can be used to characterize the power supplying mode. For example, when the charging voltage information carried by the power-supplying mode information is 5V and the charging current information is 1.5 A, it can be determined that the power supplying mode indicated by the power-supplying mode information is the normal charging mode. When the charging voltage information carried by the power-supplying mode information is 12V and the charging current information is 3 A, it can be determined that the power supplying mode indicated by the power-supplying mode information is the fast charging mode.

A control strategy determining circuit is configured to determine a voltage adjustment strategy according to a power-supplying status information and a power-supplying mode information. For example, if a charging status information is DFP, and the power-supplying mode information indicates the fast charging mode, the voltage adjustment strategy determined by the control strategy determining circuit is to charge a peripheral device in the fast charging mode.

In an example of the present disclosure, a mobile power supply 200 supports the PD (Power Delivery) protocol. In this example, the mobile power supply 200 can charge a peripheral device in the fast charging mode.

In an example, a mobile power supply 200 can select one charging mode from a normal charging mode and a fast charging mode for charging. In another example, the mobile power supply 200 can charge in the fast charging mode by default.

In a fast charging mode, there are multiple levels of charging voltage and charging current for charging. For example, the charging voltage may be 5V, 12V and 20V, and the charging current may be 1.5 A, 3 A and 5 A. A peripheral device can negotiate with a mobile power supply to determine a level of charging voltage and a level of charging current from respective charging voltage levels and respective charging current levels for charging.

An implementation process of fast charging is as follow: after a mobile power supply 200 is connected to a peripheral device through a peripheral interface 210, the peripheral device starts a PD device policy manager upon start of fast charging. The peripheral device modulates the message of the protocol layer into FSK (Frequency Shift Keying, binary frequency shift keying) signals based on the PD protocol, and couples the FSK signals to the bus power supply (such as VBUS of the type-c interface), and the PD device policy manager, when monitors that there are FSK signals coupled to the DC level of the bus power supply, can obtain the Capabilities Source message from decoding the FSK signal, and parse the Capabilities Source message based on the PD protocol to obtain a list of all voltages and currents that the peripheral device may support. The peripheral device can select a pair of voltage and current, and send a Request message carrying the pair of voltage and current to the mobile power supple 200, and the mobile power supply 200, after receiving the Request message, can output a voltage and a current corresponding to the pair of voltage and current.

In an example of the present disclosure, a mobile power supply 200 can further include a housing; at least two interface processing circuits 230, a control circuit 250, and a power supply circuit 270 which are arranged inside the housing, and the housing can provide protection for various components.

The at least two peripheral interfaces 210 are embedded in the housing and shown so as to be easily seen by the user and to facilitate the use of a peripheral interfaces 210. The position where the peripheral interface 210 is embedded in the housing can be specified.

In an example of the present disclosure, at least two peripheral interfaces 210, at least two groups of interface processing circuits 230, a control circuit 250 and a power supply circuit 270 are integrated on a PCB (Printed Circuit Board). Other circuits and components in a mobile power supply 200 also can be integrated on the PCB.

Figure 10:
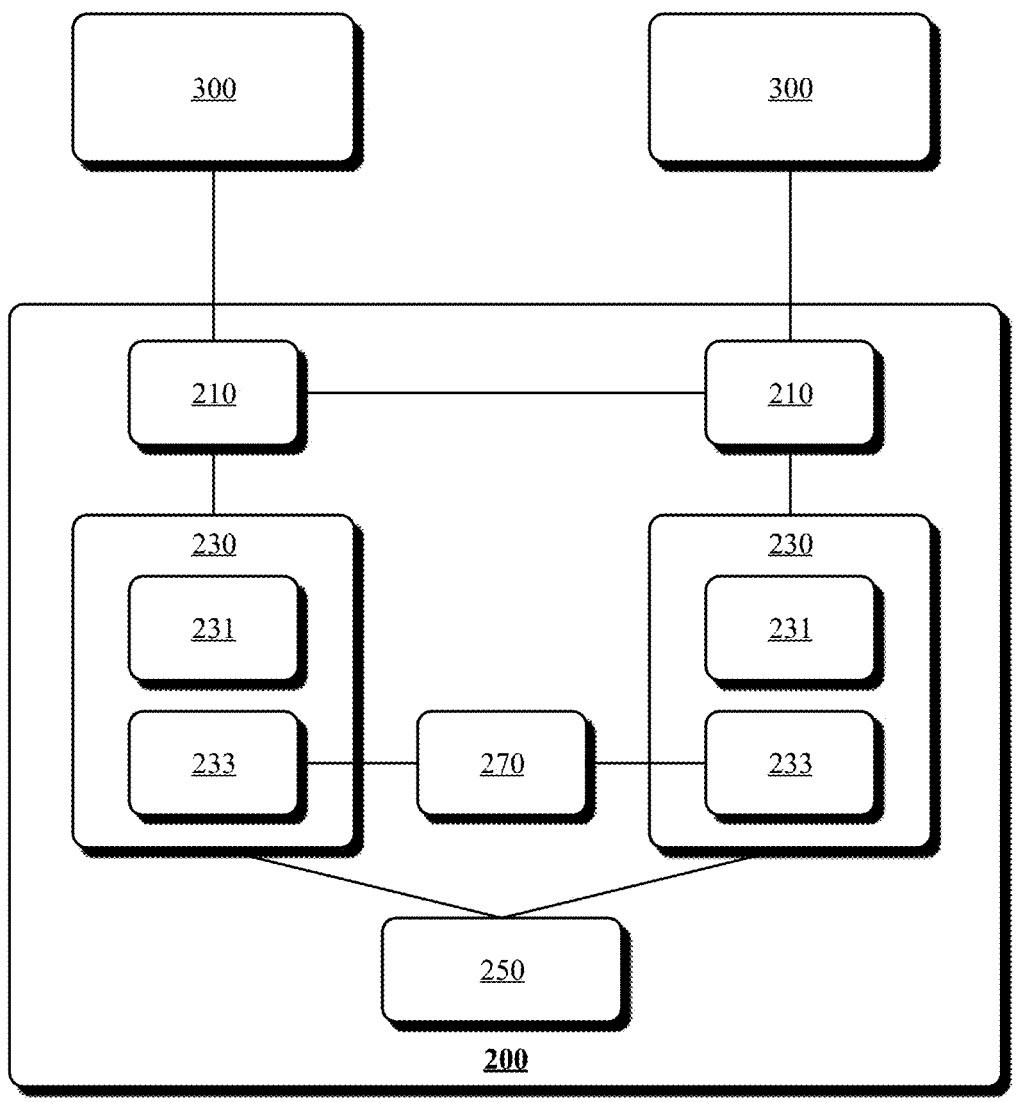
FIG. 10 is a block diagram illustrating a power supplying and communication system of an embodiment of the present disclosure.

FIG. 10 is a block diagram illustrating a power supplying and communication system 1000 of an embodiment of the present disclosure.

As shown in FIG. 10, a power supplying and communication system including a mobile power supply, a first peripheral device, and a second peripheral device.

In the embodiments of the description, a mobile power supply can implement various operations and functions described above in the FIGS. 1-9. A first peripheral device is electrically connected to the mobile power supply via a first peripheral interface; and a second peripheral device is electrically connected to the mobile power supply via a second peripheral interface. The mobile power supply supplies power to the first peripheral device via the first peripheral interface, and supplies power to the second peripheral device via the second peripheral interface; and the mobile power supply provides a data transmission channel via the first peripheral interface and the second peripheral interface to enable data transmission between the first peripheral device and the second peripheral device.

In an example of the description, a first peripheral device includes smart glasses using virtual reality technology, and a second peripheral device includes a master control device for controlling the smart glasses.

Figure 11:
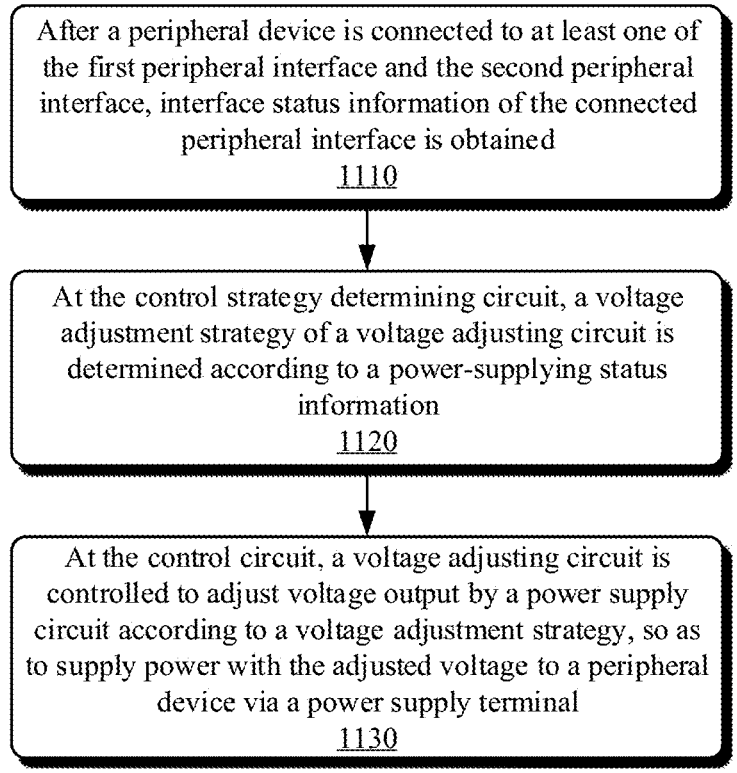
FIG. 11 shows a flowchart of a method for supplying power to peripheral devices of an embodiment of the present disclosure.

FIG. 11 shows the flowchart of a method 1100 for supplying power to peripheral devices of an embodiment of the present disclosure.

The method is performed by a mobile power supply, the mobile power supply includes a first peripheral interface and a second peripheral interface, a first group of interface processing circuits and a second group of interface processing circuits, a control circuit and a power supply circuit, each of the first peripheral interface and the second peripheral interface has a data terminal and a power supply terminal, and the data terminal of the first peripheral interface is electrically connected to the data terminal of the second peripheral interface to establish a data transmission channel, each group of interface processing circuits includes a control strategy determining circuit and a voltage adjusting circuit.

As shown in FIG. 11, at block 1110, after a peripheral device is connected to at least one of the first peripheral interface and the second peripheral interface, interface status information of the connected peripheral interface is obtained, the interface status information includes power-supplying status information.

In an example, if only a first peripheral interface or a second peripheral interface is connected to a peripheral device, a mobile power supply can supply power to the connected peripheral device. In another example, the first peripheral interface and the second peripheral interface are both connected to peripheral devices, then the mobile power supply can supply power to the connected peripheral devices, and also can provide a data communication channel for data transmission between the peripheral device connected to the first peripheral interface and the peripheral device connected to the second peripheral interface.

At block 1120, at the control strategy determining circuit, a voltage adjustment strategy of a voltage adjusting circuit is determined according to a power-supplying status information.

At block 1130, at the control circuit, a voltage adjusting circuit is controlled to adjust voltage output by a power supply circuit according to a voltage adjustment strategy, so as to supply power with the adjusted voltage to a peripheral device via a power supply terminal.

In an example of the present disclosure, interface status information includes charging mode information, and a voltage adjustment strategy is determined according to a power-supplying status information and the charging mode information.

In an example of the present disclosure, a data terminal of a first peripheral interface is further used to output interface status information of the first peripheral interface, and a data terminal of a second peripheral interface is further used to output interface status information of the second peripheral interface. The interface status information includes power-supplying status information.

In an example of the present disclosure, each of a first peripheral interface and a second peripheral interface further has an interface status information terminal, and the interface status information terminal is used to output an interface status information of the corresponding peripheral interface.

In an example of the present disclosure, each group of interface processing circuits further includes a data communication channel switching circuit, and a data terminal of a first peripheral interface is electrically connected to a data terminal of a second peripheral interface via the data communication channel switching circuit corresponding to the first peripheral interface and the data communication channel switching circuit corresponding to the second peripheral interface. The method can further include: at the control strategy determining circuit, determining a channel switching control strategy of the data communication channel switching circuit according to the corresponding connection mode of the data terminal of the first peripheral interface and the data terminal of the second peripheral interface; and at the control circuit, causing the data communication channel switching circuit to perform data communication channel switching according to the channel switching control strategy, to enable the peripheral device to implement data communication via the respective connected data terminals.

In an example of the present disclosure, each group of interface processing circuits can further include a data communication channel switching circuit, and a data terminal of a first peripheral interface is electrically connected to a data terminal of a second peripheral interface via the data communication channel switching circuit corresponding to the first peripheral interface and the data communication channel switching circuit corresponding to the second peripheral interface. Interface status information can further include device insertion direction indication information, and the device insertion direction indication information is used to indicate the insertion direction of the interface connected to a peripheral interface relative to the peripheral interface.

The method can further include: at a control strategy determining circuit, determining a channel switching control strategy of a data communication channel switching circuit according to a device insertion direction indication information; at the control circuit, causing the data communication channel switching circuit to perform data communication channel switching according to the channel switching control strategy; and in response to a data communication request initiated by a peripheral device, implementing data communication between the peripheral devices performing data communication via the switched data communication channel.

In an example of the present disclosure, interface status information can further include data communication indication information, and a channel switching control strategy is determined according to a device insertion direction indication information when the data communication indication information indicates performance of data communication.

In an example of the present disclosure, a power supply circuit includes a battery circuit and a power conversion circuit, the battery circuit includes a battery pack and a switch controlling power feeding into and output from the battery pack. The method further including: in response to that the battery circuit is not connected to an external charging power supply, the switch is closed, and the battery pack supplies power to the mobile power supply via the switch; in response to that the battery circuit is connected to an external charging power supply and the battery pack is not fully charged, the switch is closed, and the battery pack receives power provided by the external charging power supply; and in response to that the battery circuit is connected to an external charging power supply and the battery pack is fully charged, the switch is opened, and the battery pack stops receiving power provided by the external charging power supply.

In an example of the present disclosure, a battery circuit further includes a charging circuit and a charging power supply control circuit, and an electrical transmission line electrically connecting the battery pack and the charging circuit is provided with a switch, a first end of the switch is electrically connected to the power supply terminal of the battery pack, and a second end is electrically connected to the electric energy output terminal of the charging circuit and the electric energy output terminal of the battery circuit. The method further includes: receiving a signal originating from the charging power supply control circuit and indicating that no external charging power supply is connected, causing the switch to be closed, and causing the battery pack to supply power to the mobile power supply through the switch and the electric energy output terminal of the battery circuit; receiving a signal originating from the charging power supply control circuit and indicating that an external charging power supply is connected, and a signal originating from the charging circuit and indicating that the battery pack is not fully charged, causing the switch to be closed, and causing the external charging power supply, through the charging circuit and the electric energy output terminal of the battery circuit, to supply power to the mobile power supply and to the battery pack; receiving a signal originating from the charging power supply control circuit and indicating that an external charging power supply is connected, and a signal originating from the charging circuit and indicating that the battery pack is fully charged, causing the switch to be opened, and causing the external charging power supply, through the charging circuit and the electric energy output terminal of the battery circuit, to supply power to the mobile power supply and stop supplying power to the battery pack.

In an example of the present disclosure, when a peripheral device is connected to a first peripheral interface, a mobile power supply can detect the type of the peripheral device, e.g., detect whether the peripheral device is a master control device or smart glasses. According to a method of detection by the mobile power, when the peripheral device is connected to the first peripheral interface, it sends device information to the mobile power supply, and the mobile power supply determines the type of the peripheral device according to the received device information.

When the first peripheral interface is connected to the master control device, the mobile power supply can set the first peripheral interface as DFP, and the mobile power supply negotiates with the master control device through the first peripheral interface to determine the voltage, current, charging power and other information for supplying power to the master control device, then causes the voltage adjusting circuit connected to the first peripheral interface to adjust the output voltage and supply power to the master control device.

In the case that the first peripheral interface is connected to the master control device, it is detected whether a second peripheral interface is connected to a peripheral device. When the second peripheral interface is connected to another master control device, the second peripheral interface is set as DFP, and the mobile power supply negotiates charging with the another master control device through the second peripheral interface, and supplies power to the another master control device through the second peripheral interface according to the charging information determined by the negotiation. When the second peripheral interface is connected to the smart glasses, the second peripheral interface is set as DFP, and the mobile power supply supplies power to the smart glasses through the second peripheral interface.

In addition, a first peripheral interface and a second peripheral interface also can be used as interfaces for data transmission, and the first peripheral interface can be set as the data slave role UFP, at this point, a master control device takes the data master role. The second peripheral interface is set as the data master role DFP, and at this point, smart glasses take the data slave role. The master control device transmits data to the first peripheral interface of a mobile power supply, and a data communication channel switching circuit 235 in the mobile power supply establishes a connection channel between the first peripheral interface and the second peripheral interface, and data is transmitted to the second peripheral interface through the connection channel, and the mobile power supply transmits the data to the smart glasses through the second peripheral interface. The master control device and the smart glasses perform the data swap process through the data interaction method described above. It should be noted that, when both the first peripheral interface and the second peripheral interface are connected to the master control devices, data interaction also can be performed in the manner described above, for example, when the first peripheral interface is connected to the mobile phone A, and the second peripheral interface is connected to the mobile phone B, the mobile phone A and the mobile phone B can exchange data through the connection channel established by the data communication channel switching circuit 235.

When the first peripheral interface is connected to the smart glasses, the first peripheral interface is set as DFP, and the mobile power supply supplies power to the smart glasses through the first peripheral interface. At this point, when the second peripheral interface is connected to the master control device, the second peripheral interface may be set as DFP, and the mobile power supply negotiates with the master control device through the second peripheral interface, then causes a voltage adjusting circuit connected to the second peripheral interface to adjust the output voltage and supply power to the master control device. In addition, the first peripheral interface can be set as the data master role DFP, and at this point, the smart glasses take the data slave role. The second peripheral interface is set as the data slave role UFP, and at this point, the master control device takes the data master role. The master control device transmits data to the second peripheral interface of the mobile power supply, and the data communication channel switching circuits 235 in the mobile power supply establish a connection channel between the first peripheral interface and the second peripheral interface, and data is transmitted to the first peripheral interface through the connection channel, and the mobile power supply transmits the data to the smart glasses through the first peripheral interface. Thereby, the master control device and the smart glasses perform the data swap process through the data interaction method described above.

In the case that the first peripheral interface is connected to the smart glasses, when the second peripheral interface is connected to another smart glasses, the second peripheral interface is set as DFP, and the mobile power supply supplies power to the another smart glasses through the second peripheral interface. At this point, the mobile power supply supplies power to two smart glasses at the same time.

The embodiments of mobile power supply and method for supplying power to peripheral devices according to the present disclosure have been described above with reference to FIGS. 1 to 11.

Each unit of mobile power supply of the present disclosure may be implemented by hardware, by software or by a combination of hardware and software. Taking software implementation as an example, as an apparatus in a logical sense, it is formed through the processor of the device where it is located reading the corresponding computer program instructions in the memory into the memory to run. In the present disclosure, each unit of the mobile power supply may be implemented with, e.g., an electronic device.

Figure 12:
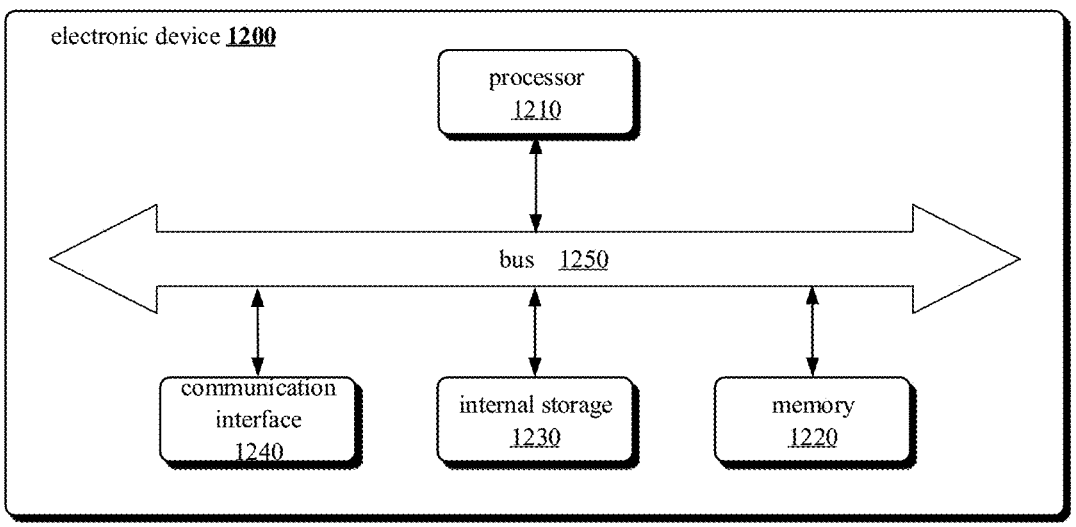
FIG. 12 shows a block diagram of electronic device for implementing a method for supplying power to peripheral devices of an embodiment of the present disclosure.

FIG. 12 shows the block diagram of electronic device 1200 for implementing a method for supplying power to peripheral devices of an embodiment of the present disclosure.

As shown in FIG. 12, the electronic device 1200 may comprise at least one processor 1210, memory (e.g., non-volatile memory) 1220, internal storage 1230, and communication interface 1240, and the at least one processor 1210, memory 1220, internal storage 1230, and communication interface 1240 are connected together via bus 1250. At least one processor 1710 executes at least one computer-readable instruction (i.e., the elements implemented in software described above) stored or encoded in a memory.

In an embodiment, computer-executable instructions are stored in the memory, which, when executed cause the at least one processor 1210 to: after the peripheral device is connected to at least of the first peripheral interface and the second peripheral interface, interface status information of the connected peripheral interface is obtained, the interface status information includes power-supplying status information; at the control strategy determining circuit, a voltage adjustment strategy of the voltage adjusting circuit is determined according to the power-supplying status information; and at the control circuit, the voltage adjusting circuit is controlled to perform voltage adjustment on the voltage output by the power supply circuit according to the voltage adjustment strategy, to supply power with the adjusted voltage to a peripheral device via the power supply terminal.

It should be understood that the computer-executable instructions stored in the memory, when executed, cause the at least one processor 1210 to perform various operations and functions described above in conjunction with FIGS. 1-11 in the various embodiments of the present disclosure.

According to an embodiment, a program product such as a machine-readable medium is provided. Machine-readable medium may have instructions (i.e., the elements implemented in the form of software described above), which, when executed by a machine, cause the machine to execute various operations and functions described above in conjunction with FIGS. 1-11 in the various embodiments of the present disclosure.

Specifically, a system or an apparatus equipped with a readable storage medium may be provided, and the software program code for implementing the function of any one of the embodiments described above is stored on the readable storage medium, and the computer or processor of the system or apparatus is caused to read out and execute the instructions stored in the readable storage medium.

In this case, the program code itself read from the readable medium may realize the function of any one of the embodiments described above, so the machine readable code and the readable storage medium storing the machine readable code constitute a part of the present invention.

Embodiments of readable storage media comprise floppy disk, hard disk, magneto-optical disk, optical disk (such as CD-ROM, CD-R, CD-RW, DVD-ROM, DVD-RAM, DVD-RW, DVD-RW), magnetic tape, non-volatile memory card and ROM. Alternatively, the program code may be downloaded from a server computer or cloud via a communication network.

The foregoing describes specific embodiments of the present disclosure. Other embodiments are within the scope of the appended claims. In some cases, the actions or steps set forth in the claims may be performed in a different order than that in the embodiments and still achieve desired results. In addition, the processes described in the accompanying drawings do not necessarily require the illustrated specific order or sequential order to achieve the desired result. In certain implementations, multitasking and parallel processing are also possible or may be advantageous.

Not all steps and units in the processes and system structure diagrams described above are necessary, and some steps or units may be omitted according to actual needs. The performance order of each step is not fixed, and may be determined as needed. The apparatus structure described in the foregoing embodiments may be a physical structure or a logical structure, that is, some units may be implemented by a same physical entity, or some units may be implemented by multiple physical entities separately, or may be jointly implemented by some parts in multiple independent devices.

The term "exemplary" used throughout the present disclosure means "serving as an example, instance, or illustration", and not "preferred" or "advantageous" over other embodiments. The detailed description includes specific details for the purpose of providing an understanding of the described techniques. These techniques, however, may be practiced without these specific details. In some instances, well-known structures and apparatuses are shown in block diagram form in order to avoid obscuring the concepts of the described embodiments.

The optional implementations of the embodiments of the present disclosure are described above in detail in conjunction with the accompanying drawings, however, the embodiments of the present disclosure are not limited to the specific details in the foregoing embodiments, within the scope of the technical concept of the embodiments of the present disclosure, a variety of simple variations may be made to the technical solutions of the embodiments of the present disclosure, which all fall into the scope of the embodiments of the present disclosure.

The foregoing description of the present disclosure is provided to enable a person skilled in the art to implement or use the present disclosure. Various modifications to the present disclosure will be readily apparent to those skilled in the art, and the generic principles defined herein may be applied to other variations without departing from the scope of the present disclosure. Thus, the present disclosure is not limited to the examples and designs described herein, but is to be accorded the broadest scope consistent with the principles and novel features disclosed herein.

What is claimed is:

1. A mobile power supply, comprising:
 a first peripheral interface and a second peripheral interface, each of the first peripheral interface and the second peripheral interface having a data terminal and a power supply terminal, and the data terminal of the first peripheral interface being electrically connected to the data terminal of the second peripheral interface to establish a data transmission channel;
 a first group of interface processing circuits and a second group of interface processing circuits, each group of interface processing circuits comprising a control strategy determining circuit and a voltage adjusting circuit;
 a control circuit; and
 a power supply circuit electrically connected to the voltage adjusting circuit,
 wherein the first group of interface processing circuits are electrically connected to the first peripheral interface and the control circuit, and the second group of interface processing circuits are electrically connected to the second peripheral interface and the control circuit, and the control strategy determining circuits are configured to determine a voltage adjustment strategy of the voltage adjusting circuits, according to power-supplying status information of at least one of the first peripheral interface and the second peripheral interface, and
 the control circuit is configured to cause the voltage adjusting circuits to adjust voltage output by the power supply circuit according to the voltage adjustment strategy, to supply power with adjusted voltage to a peripheral device coupled to the at least one of the first peripheral interface and the second peripheral interface via the power supply terminal,
 wherein the data terminal of the first peripheral interface comprises a first TX1, TX2, RX1, RX2, and SBU, the data terminal of the second peripheral interface comprises a second TX1, TX2, RX1, RX2, and SBU, the first group of interface processing circuits comprise a first data communication channel switching circuit electrically connected to the first TX1, TX2, RX1, RX2, and SBU, the second group of interface processing circuits comprise a second data communication channel switching circuit connected to the second TX1, TX2, RX1, RX2, and SBU, and the first data communication channel switching circuit is electrically connected to the second data communication channel switching circuit, to establish a channel for transmission of Display Port data.

2. The mobile power supply of claim 1, wherein the data terminal of the first peripheral interface is further configured to output interface status information of the first peripheral interface, and the data terminal of the second peripheral interface is further configured to output interface status information of the second peripheral interface, wherein the interface status information comprises power-supplying status information.

3. The mobile power supply of claim 2, wherein the data terminal of the first peripheral interface is electrically connected to the data terminal of the second peripheral interface via the first data communication channel switching circuit corresponding to the first peripheral interface and the second data communication channel switching circuit corresponding to the second peripheral interface, wherein the interface status information further comprises device insertion direction indication information, and the device insertion direction indication information is configured to indicate an insertion direction of an interface connected to the at least one of first peripheral interface and the second peripheral interface relative to the at least one of first peripheral interface and the second peripheral interface, the control strategy determining circuits are configured to determine a channel switching control strategy of the first and second data communication channel switching circuits according to the device insertion direction indication information, and the control circuit is configured to cause the first and second data communication channel switching circuits to perform data communication channel switching according to the channel switching control strategy, to enable the peripheral device to establish data transmission channels via respective connected data terminals to implement data communication.

4. The mobile power supply of claim 3, wherein the interface status information further comprises data communication indication information, and the control strategy determining circuits are configured to determine a channel switching control strategy of the first and second data communication channel switching circuits according to the device insertion direction indication information, in response to that the data communication indication information indicates performance of data communication.

5. The mobile power supply of claim 2, wherein the interface status information further comprises power-supplying mode information, and the control strategy determining circuits are configured to determine the voltage adjustment strategy according to the power-supplying status information and the power-supplying mode information.

6. The mobile power supply of claim 1, wherein each of the first peripheral interface and the second peripheral interface further has an interface status information terminal, and the interface status information terminals are configured to output interface status information of the first peripheral interface and the second peripheral interface, the interface status information comprises power-supplying status information.

7. The mobile power supply of claim 1, wherein the data terminal of the first peripheral interface is electrically connected to the data terminal of the second peripheral interface via the first data communication channel switching circuit and the second data communication channel switching circuit, wherein the control strategy determining circuits are configured to determine a channel switching control strategy of the first and second data communication channel switching circuits according to a corresponding connection mode of the data terminal of the first peripheral interface and the data terminal of the second peripheral interface; and the control circuit is configured to cause the first and second data communication channel switching circuits to perform data communication channel switching according to the channel switching control strategy, to enable the peripheral device to establish data transmission channel via respective connected data terminals to implement data communication.

8. The mobile power supply of claim 7, wherein the control circuit is integrated into a component with at least one of the following circuits:

the control strategy determining circuit;
the voltage adjusting circuit;
the first data communication channel switching circuit; and
the second data communication channel switching circuit.

9. The mobile power supply of claim 1, wherein the power supply circuit comprises a power conversion circuit for providing a regulated voltage in the mobile power supply.

10. The mobile power supply of claim 9, wherein the power supply circuit further comprises a battery circuit, the battery circuit is configured to store energy and supply power.

11. The mobile power supply of claim 10, wherein the battery circuit comprises a battery pack, a charging circuit, and a charging power supply control circuit, and the charging circuit is connected to the battery pack and the charging power supply control circuit.

12. The mobile power supply of claim 11, wherein the charging circuit is configured to balance power of respective battery cells in the battery pack.

13. The mobile power supply of claim 11, wherein an electric energy output terminal of the battery circuit comprises a power supply terminal of the battery pack and an electric energy output terminal of the charging circuit, wherein the electric energy output terminal is connected to the power conversion circuit and the voltage adjusting circuits.

14. The mobile power supply of claim 13, wherein an electrical transmission line electrically connecting the battery pack and the charging circuit is provided with a switch, a first end of the switch is electrically connected to the power supply terminal of the battery pack, and a second end is electrically connected to the electric energy output terminal of the charging circuit and the electric energy output terminal of the battery circuit, the control circuit is communicatively connected to the switch, the charging circuit, and the charging power supply control circuit.

15. The mobile power supply of claim 1, wherein the data terminal of the first peripheral interface comprises a first D+ and D−, the data terminal of the second peripheral interface comprises a second D+ and D−, and the first D+ and D− are directly connected to the second D+ and D−, to establish a channel for transmission of communication signal data.

16. A mobile power supply, comprising:
a first peripheral interface and a second peripheral interface, each of the first peripheral interface and the second peripheral interface having a data terminal and a power supply terminal, and the data terminal of the first peripheral interface being electrically connected to the data terminal of the second peripheral interface to establish a data transmission channel;

a first group of interface processing circuits and a second group of interface processing circuits, each group of interface processing circuits comprising a control strategy determining circuit and a voltage adjusting circuit;

a control circuit; and a power supply circuit electrically connected to the voltage adjusting circuit, wherein the first group of interface processing circuits are electrically connected to the first peripheral interface and the control circuit, and the second group of interface processing circuits are electrically connected to the second peripheral interface and the control circuit, and the control strategy determining circuit is configured to determine a voltage adjustment strategy of the voltage adjusting circuit, according to power-supplying status information of at least one of the first peripheral interface and the second peripheral interface, and the control circuit is configured to cause the voltage adjusting circuit to adjust voltage output by the power supply circuit according to the voltage adjustment strategy, to supply power with adjusted voltage to a peripheral device coupled to the at least one of the first peripheral interface and the second peripheral interface via the power supply terminal, wherein the first group of interface processing circuits comprise a first data communication channel switching circuit with a first channel switch, and the second group of interface processing circuits comprise a second data communication channel switching circuit with a second channel switch, the control strategy determining circuits are further configured to:

in response to that a corresponding connection mode of the data terminal of the first peripheral interface and a corresponding connection mode of the data terminal of the second peripheral interface are both a first connection mode, the first channel switch and the second channel switch are both placed at a first position;

in response to that a corresponding connection mode of the data terminal of the first peripheral interface and a corresponding connection mode of the data terminal of the second peripheral interface are both a second connection mode, the first channel switch and the second channel switch are both placed at a second position; and in response to that a corresponding connection mode of the data terminal of the first peripheral interface is one of a first connection mode and a second connection mode, and a corresponding connection mode of the data terminal of the second peripheral interface is the other one of the first connection mode and the second connection mode, the first channel switch is placed at one of a first position and a second position, and the second channel switch is placed at the other one of the first position and the second position.

17. The mobile power supply of claim 1, wherein the power-supplying status information comprises DFP information and UFP information, in response to that the power-supplying status information is DFP information, the voltage adjustment strategy is configured to make that power is supplied to the peripheral device and the voltage adjusting circuit adjusts output voltage, and in response to that the power-supplying status information is UFP information, the voltage adjustment strategy is configured to make that the voltage adjusting circuit does not output voltage.

18. A method for supplying power to two peripheral devices, the method being performed by a mobile power supply, the mobile power supply comprising a first peripheral interface and a second peripheral interface, a first group of interface processing circuits and a second group of interface processing circuits, a control circuit and a power supply circuit, each of the first peripheral interface and the second peripheral interface having a data terminal and a power supply terminal, and the data terminal of the first peripheral interface being electrically connected to the data terminal of the second peripheral interface to establish a data transmission channel, each group of interface processing circuits comprising a control strategy determining circuit and a voltage adjusting circuit, the first group of interface processing circuits comprising a first data communication channel switching circuit and a second group of interface processing circuits comprising a second data communication channel switching circuit, the method comprising:

after the two peripheral devices connecting to the first peripheral interface and the second peripheral interface, respectively, obtaining interface status information of the first peripheral interface and the second peripheral interface, wherein the interface status information comprises power-supplying status information;

at the control strategy determining circuit, determining a voltage adjustment strategy of the voltage adjusting circuit according to the power-supplying status information, and determining a first channel switching control strategy of the first data communication channel switching circuit and a second channel switching control strategy of the second data communication channel switching circuit, according to a corresponding connection mode of the data terminal of the first peripheral interface and a corresponding connection mode of the data terminal of the second peripheral interface; and at the control circuit, causing the voltage adjusting circuit to adjust voltage output by the power supply circuit according to the voltage adjustment strategy, to supply power with adjusted voltage to the two peripheral devices via the power supply terminal.

19. The method of claim 18, wherein the data terminal of the first peripheral interface is further configured to output interface status information of the first peripheral interface, and the data terminal of the second peripheral interface is further configured to output interface status information of the second peripheral interface, wherein the interface status information comprises power-supplying status information.

20. The method of claim 18, wherein each of the first peripheral interface and the second peripheral interface further has an interface status information terminal, and the interface status information terminal is configured to output interface status information of the first peripheral interface and the second peripheral interface, the interface status information comprises power-supplying status information.

* * * * *